United States Patent
Smith

(10) Patent No.: US 10,766,277 B2
(45) Date of Patent: Sep. 8, 2020

(54) APPARATUS AND METHODS FOR MASKING A PRINTER TABLE

(71) Applicant: Inca Digital Printers Limited, Cambridge (GB)

(72) Inventor: Philip Russell James Smith, Cambridge (GB)

(73) Assignee: Inca Digital Printers Limited, Cambridge (GB)

( * ) Notice: Subject to any disclaimer, the term of this patent is extended or adjusted under 35 U.S.C. 154(b) by 0 days.

(21) Appl. No.: 16/262,912

(22) Filed: Jan. 31, 2019

(65) Prior Publication Data
US 2019/0232685 A1 Aug. 1, 2019

(30) Foreign Application Priority Data
Jan. 31, 2018 (GB) .................................. 1801584.2

(51) Int. Cl.
| | | |
|---|---|---|
| *B41J 11/02* | (2006.01) | |
| *B41J 11/00* | (2006.01) | |
| *F16K 1/14* | (2006.01) | |
| *F16K 31/32* | (2006.01) | |
| *F16K 15/04* | (2006.01) | |
| *F16K 31/06* | (2006.01) | |
| *B41J 11/06* | (2006.01) | |
| *B41J 3/28* | (2006.01) | |

(52) U.S. Cl.
CPC .............. *B41J 11/0085* (2013.01); *B41J 11/06* (2013.01); *F16K 1/14* (2013.01); *F16K 15/044* (2013.01); *F16K 31/06* (2013.01); *F16K 31/32* (2013.01); *B41J 3/28* (2013.01)

(58) Field of Classification Search
CPC .......... B41F 15/20; B41J 11/02; B41J 11/007; B41J 13/12; B41J 13/226; B41J 13/24; B41J 15/005; B41J 15/048; B41J 17/02; B41J 13/0054; B41J 13/103
See application file for complete search history.

(56) References Cited

FOREIGN PATENT DOCUMENTS

| | | |
|---|---|---|
| JP | S63144049 | 6/1988 |
| JP | H04269143 | 9/1992 |
| KR | 1020140005084 | 1/2014 |

OTHER PUBLICATIONS

The Intellectual Property Office of the United Kingdom. "Combined Search and Examination Report under Sections 17 and 18(3)," dated Jul. 11, 2018, pp. 1-6.
European Patent Office. EPODOC of JPS63144049. p. 1.
European Patent Office. EPODOC of JPH04269143. p. 1.

*Primary Examiner* — Kristal Feggins
(74) *Attorney, Agent, or Firm* — MacMillan, Sobanski & Todd, LLC

(57) ABSTRACT

A printer table for supporting a substrate during a printing operation comprises a substrate support surface comprising a plurality of apertures. The apertures are arranged such that a substrate placed on the printer table covers at least one of the apertures. The printer table comprises a plurality of ball valves arranged in fluidic connection with the apertures, where each of the ball valves has an open configuration and a closed configuration and is biased to the open configuration. The printer table also comprises a negative air pressure source configured to apply a negative air pressure through the plurality of ball valves to the plurality of apertures.

18 Claims, 15 Drawing Sheets

APPARATUS AND METHODS FOR MASKING A PRINTER TABLE

The present invention relates to the field of printer tables, and in particular a printer table for supporting a substrate during a printing operation, the table having apertures through which a negative pressure is applied to retain the substrate on the table during the printing operation.

Vacuum tables are used for supporting a substrate in a flatbed printer. Vacuum tables include a surface for supporting a substrate being printed. This is often a flat, upper surface of the table, although different topographies may be used for different substrates in particular situations. Apertures are provided in the surface of the table, with the apertures connected to a source of negative air pressure. The substrate is placed onto the table for printing, the substrate covering at least some of the apertures on the table surface. During printing, when the negative pressure is applied, air is drawn through the apertures in the table. The negative pressure can therefore act to hold the substrate to the table.

However, problems can arise where the size of the substrate is less than the area of the table populated by the apertures. In such a situation, when the substrate is placed on the table, some apertures remain uncovered by the substrate. Leaving such apertures uncovered during printing can be problematic because it leads to a loss of vacuum pressure across the table as a whole, reducing the force holding the substrate against the table when some apertures remain uncovered. Therefore, when some of the apertures remain uncovered, it reduces the effectiveness of the pressure securing the substrate on the table. This means that the substrate may not lie completely flat and uniformly on the surface, and may lead to printing errors such as a reduction in print quality or other malfunction of the system. The greater the number of apertures remaining uncovered, the greater the problem.

An additional problem can arise where apertures remain uncovered during a printing operation. Open apertures can lead to a high airflow near print head nozzles, which can disrupt printing and lead to a reduction in print quality.

In an attempt to improve this arrangement, a mask is applied to the table to cover the apertures not covered by the substrate. Such masks, for example, may comprise paper, card, or a plastic sheet material cut to the appropriate shape. In particular, in cases where the area of the table not covered by the substrate is a particularly irregular shape, the mask may comprise several mask elements. The application of the negative pressure during printing acts to hold the mask to the table. However, in practical applications, it is generally desirable to fix the mask to the table, in particular where a similar layout of substrates is to be used for several consecutive printing operations. For example, once the printing on the substrate is complete, the pressure source may provide a positive pressure to the apertures on the table to assist in the removal of the printed substrate. Such application of positive pressure has the effect of also dislodging the mask which, in particular where several substrates are to be printed using the same mask arrangement, is disadvantageous.

In cases where a mask comprises a plastic sheet, a tacky or adhesive backing may be provided to hold the mask to the surface. However, this can leave an adhesive residue on the surface of the table. Such a mask is also not suitable for repeated application and removal from the table and can have a limited service life.

Alternatively, in particular where the mask comprises paper or card, the mask may be fixed in place on the table, for example using adhesive tape, or the mask itself may be formed of an adhesive material. However, such taping is labour intensive and adds significant time to the print cycle.

A further problem is that the tape or adhesive used is often not resistant to the effects of radiation, for example UV radiation or heat, to which it can be exposed during the printing cycle. In particular, for masks subjected to several printing cycles, this can lead to loss of adhesion between the tape or mask material and the table, and subsequent lifting or curling of the tape or mask material. This can then lead to a loss of printing quality or halting of the printing cycle to reattach the tape.

If several sets of one or more substrates of similar configuration are to be printed using the same mask arrangement, then the mask is usually retained on the table for the printing of the sets of substrates. This can lead to a greater risk of the tape holding the mask becoming dislodged. Also, as mentioned above, the pressure source can be used to blow air through the apertures after the printing operation to assist in the removal of the substrate. This practice can lead to damage of the mask and greater risk of parts of the tape or mask lifting from the table.

In an alternative approach, the apertures are arranged in regions on the table, the pressure applied to each region being independently controllable. Thus in such arrangements one or more pressure sources are used selectively to apply negative pressure to one or more of the regions in an attempt to only apply the negative pressure to apertures covered by the substrate. Notably, when retaining a substrate on a table using vacuum apertures, the most important region of the substrate to secure to the table are the edges of the substrate, since the edges of a substrate are more likely to bend or curl if not secured. However, experience of these systems has shown that the aperture regions often do not correspond to the shapes of the substrates to be printed; hence some additional masking is often required even in such systems. Also, the pressure supply mechanism is greatly increased in complexity and cost to support the independently-controllable regions.

Further methods have been developed to apply pressure to the apertures covered by the mask and those covered by the substrate separately. When several sets of one or more substrates of similar configuration are to be printed using the same mask arrangement, this allows for removal of the substrate without changing the configuration of the mask. This can be achieved by applying a positive pressure to the substrate apertures while maintaining a negative pressure on the mask apertures. While this represents an improvement upon previous designs, this system still requires the production of new masks for each printing configuration, an undesirable use of time and resources.

Disclosed herein is a printer table for supporting a substrate during a printing operation, comprising: a substrate support surface comprising a plurality of apertures, the apertures arranged such that a substrate placed on the printer table covers at least one of the apertures; a plurality of ball valves arranged in fluidic connection with the apertures, each of the ball valves having an open configuration and a closed configuration, and wherein each ball valve is biased to the open configuration; and a negative air pressure source configured to apply a negative air pressure through the plurality of ball valves to the plurality of apertures.

In many printing operations, the substrate to be printed is an irregular shape that is not complementary to the configuration of apertures on the printing table. For example, if the substrate is smaller than the support surface, then a region of apertures around the substrate would remain uncovered.

Providing ball valves in fluidic connection with the table apertures enables selected apertures to be closed by moving the ball valve to the closed configuration, hence enabling those apertures that are not covered by a substrate to be masked and closed. This can improve the efficiency of the negative air pressure source, and improve the effectiveness of holding the substrate against the support surface where required.

The negative air pressure source may be a pump, a fan, or other equivalent negative pressure source capable of generating an air pressure that is lower than the pressure above the support surface. The negative air pressure acts to create a suction force at the aperture to hold the substrate in place against the table for printing. The negative pressure is applied to all apertures on the support surface.

At least one substrate to be printed on will be laid on the support surface of the printing table. When positioned correctly, the substrate can be held to the table by the applied negative pressure. During printing, a printing apparatus is reciprocated over the substrate at high speed. However, other embodiments are envisaged wherein the printing table is reciprocated under a stationary printing apparatus, for example on a conveyor belt. It is important that the substrate is held securely so that it does not move relative to the table during printing. This is, in part, because the position of the substrate is determined and monitored with reference to the position of the table. There is also a benefit in the substrate being held flat onto the table so that the upper surface onto which the ink is deposited is flat. Lifting or wrinkling of the substrate on the table leads to a reduction in print quality of the image printed on the substrate. Holding the substrate to the table with the application of negative pressure reduces the movement in any dimension and causes the substrate to lay flat on the table, reducing any wrinkles or protrusions from the plane of the support surface.

The ball valves are arranged between the negative air pressure source and the apertures. The negative air pressure source is therefore in fluidic connection with the apertures when the ball valves are in the open configuration. The negative air pressure acts to retain a substrate placed on the substrate support surface against the apertures.

Each of the ball valves is biased to the open configuration. Therefore, in the absence of a negative pressure applied through the ball valves to the apertures, the ball valves remain in the open configuration. Optionally, each of the plurality of ball valves further comprises biasing means for biasing the ball valve to the open configuration. For example, the biasing means may be a spring configured to position the ball valve in the open configuration. Equivalent biasing means, such as an extensible string, or an elastically-deformable material are also envisaged.

Optionally, the plurality of ball valves each comprise a ball and a valve opening, the ball arranged to form a seal against the valve opening in the closed configuration. In one embodiment, the ball of a ball valve may be biased to the open configuration by a biasing means such as a spring, positioning the ball away from a valve opening and preventing a seal from forming. The valve opening is located between the pressure source and the aperture. The ball may be a spherical shape, but other shapes are envisaged. For example the ball may be an oval, or have a tapered or wedge shape to form a complementary seal to a specific shape of valve opening.

Optionally, when an aperture is covered by a substrate, the ball valve remains biased in the open configuration against the negative air pressure. The negative air pressure applied to the ball valve causes a pressure differential across the ball valve. The pressure differential acts against the bias. The pressure differential can be considered as the pressure difference between a position at the aperture and a position between the valve opening and the pressure source. If the pressure differential is great enough then it may overcome the bias and close the valve.

Optionally, when an aperture is covered by a substrate, the biasing means of the ball valve retains the ball valve in the open configuration against the action of the pressure differential. In the case where an aperture is covered by a substrate, the pressure at a position between the ball valve and the negative pressure source will typically be a negative air pressure determined by the negative air pressure source, where the pressure source may generate about 50 mbar, for example. The pressure at a position near the aperture will be substantially the same negative pressure as at the other side of the ball valve due to the valve being open, and the aperture in fluidic connection with the valve and correspondingly with the negative pressure source. Fluidic connection to atmospheric pressure above the aperture is prevented by the substrate covering the aperture, and the negative pressure holding it in place. The negative pressure is increased slowly to enable a flow of air to pass around the ball valve to the aperture, maintaining both positions at the same pressure. The result of this is that the pressure differential is zero, negligible, or at least too low to cause a force to overcome the bias, meaning the ball valve remains in the open configuration. This allows the negative pressure to hold the substrate to the support surface.

Optionally, when an aperture is not covered by a substrate, the negative air pressure moves the ball valve to the closed configuration. Optionally, when an aperture is not covered by a substrate the pressure differential acts against the biasing means of the ball valve to move the ball valve to the closed configuration. The pressure at a position between the ball valve and the pressure source will remain unchanged, and still be a negative air pressure. The pressure at a position on the other side of the ball valve, near the aperture, will be approximately atmospheric pressure as the aperture is not covered by a substrate, and will be much greater than the pressure at the negative pressure source. This causes a pressure differential across the ball valve. The pressure differential acts as a net force towards the negative air pressure source, against the bias of the ball valve. If the pressure differential is great enough to exceed the biasing force, the pressure will move the ball valve to the closed configuration, sealing the valve.

Optionally, the ball valve moves to the closed configuration when the pressure differential across the ball valve exceeds a threshold value. The threshold value can be considered as the pressure differential required to overcome the biasing force maintaining the ball valve in the open position, and therefore the pressure differential required to close the valve. As the magnitude of the negative pressure is slowly increased, the pressure differential across the ball valve increases. When the pressure differential exceeds the threshold value, the ball valve will seal. Optionally, when an aperture is covered by a substrate, the pressure differential across the ball valve is below a threshold value. Optionally, when an aperture is not covered by a substrate, the pressure differential across the ball valve exceeds a threshold value.

Hence the biased ball valve allows the valve to remain open when a substrate is covering an aperture, and to close when a substrate is not covering an aperture due to the application of negative pressure. This allows the negative air pressure to hold the substrate on the support surface at apertures that are covered, while allowing apertures to seal automatically when they are not covered by a substrate, enabling straightforward automatic masking of any apertures not covered by the substrate. The arrangement can also act to increase the efficiency of the negative air pressure source, and increasing the effectiveness of holding the substrate in position on the table.

When no substrate covers the aperture, the negative pressure source cannot reduce the pressure under the open aperture, and consequently acts to seal the valve. Hence when no substrate covers an aperture, the valve closes and the negative pressure applied to the other apertures is not reduced, thereby increasing the efficiency of holding the substrate and minimising wasted power of the negative pressure source. The magnitude of the negative pressure is increased slowly, slowly increasing the pressure differential across the ball valve and preventing premature and erroneous closing of ball valves associated with covered apertures.

The ball valve may be biased by a number of means. For example, a spring may be used to position the ball away from the valve opening. In some examples the biasing means comprises a spring. In this case the spring is positioned under the ball and supports the weight of the ball. The spring may be chosen by considering the physical size of the ball valve. The diameter of the ball valve may be determined by the size of the ball. For example, the diameter of a standard ball may be 10 mm and the corresponding inner width of the ball valve may be 10.2 mm, or another size slightly larger than the diameter of the ball. In some cases, the spring may be positioned within the valve opening, which may for example be 6 mm. The spring must be small enough to fit inside the ball valve, and within the valve opening if required.

The strength of the biasing force is arranged such that the pressure differential over the valve opening when the aperture is not covered is sufficient to overcome the biasing force and close the ball valve. The spring should also be chosen to have a stiffness such that it biases the ball away from the valve opening, even under the weight of the ball and any small pressure differential that may occur for example when a particularly porous substrate is used. The strength of the spring must be chosen such that the biasing force is overcome by a pressure differential that is reasonably achievable by the negative pressure source used in the system. The pressure differential threshold required to close a valve may be at least 10 mbar, for example 15 mbar, preferably less than 20 mbar. In some cases, the pressure differential across the ball may be substantially less than the difference between the pressure at the negative pressure source and at the aperture. In particular, a significant drop in pressure differential may occur in the manifolds and pipework that link the pressure source to the ball valves. This means that the actual pressure differential acting across the valve will be less than the pressure produced by the negative pressure source. As such, a suitable pressure source must be used, capable of achieving the required pressure differential, accounting for losses in the pipework, for example. As the skilled person will appreciate, the strength of the negative pressure source used in a particular implementation will depend in part on the pressure loss between the source and the apertures.

Moreover, a significant factor contributing to closure of the valve will be the frictional force between the air moving past the ball of the valve and the outer surface of the ball.

The negative pressure should cause forces on the ball of the value that exceed the threshold required to overcome the biasing means. For example, consider a compression spring with stiffness constant 60 N/m, and a required compression of 2 mm to close the valve. By using Hooke's Law as an approximation, the required force to achieve this is approximately 0.12 N. The pressure differential must then cause a force on the ball to exceed this.

This valve design can be drilled or otherwise machined into the printing table. The valve could also be manufactured separately by means of moulding, casting, machining, or 3D printing and incorporating into the body of the printing table afterwards. The design is also flush with the support surface, avoiding protrusions above the surface that may cause damage to the substrate or printing apparatus.

It would be clear to a skilled person that a suitable compressible member could be used to support the weight of the ball such that the valve remains open when a substrate covers the aperture, and is configured to be compressed under the application of a pressure differential above the threshold when an aperture is not covered by a substrate. In this case, the resistance of the compressible member is overcome by the negative pressure such that the ball moves towards, and seals, the valve opening.

Another variation of a biasing means may be provided comprising an extensible member e.g. a tension spring, configured to suspend the ball away from the valve opening. In this example, the weight of the ball is matched by the tension in the spring. When a negative pressure above the threshold is applied, the ball is pulled down towards the valve opening, overcoming the tension in the spring, and sealing the valve. Other equivalents are envisaged wherein the tension or resistive force of a biasing means is overcome by the negative pressure causing a friction on the ball, pulling the ball towards the ball valve, and closing the valve. For example, the extensible member that suspends the ball may be an elastic flexible member, or the like, that is configured to support the weight of the ball, but stretch upon application of the negative pressure, allowing the valve to close.

In another variation, the ball valve is biased to the open configuration by the action of gravity on the ball. In this example, the valve opening is positioned above the ball, such that the weight of the ball positions the ball away from the valve opening and biases the ball valve to the open configuration. Optionally, the printer table further comprises a ledge for supporting the ball when the ball valve is in the open configuration. The ball may be held in position by resting on a ledge or another surface connected to the walls of the valve. To achieve this in practice, while the aperture hole is on the upper surface of the printer table and the negative pressure source is positioned underneath, configurations such as U-bends may be utilised to feed both the aperture and the negative pressure source to the ball valve. The ledge is preferably formed as a non-continuous surface to allow air to bypass the ball when the valve is in the open configuration.

Although a more complex aperture system may be required, in this embodiment a separate biasing means is not required, as the biasing is performed by the weight of the ball, and the support from the ledge. The threshold pressure differential can be tuned by varying the clearance separation between the outer diameter of the ball and the wall of the ball valve bore. Other shapes of the walls of the ball valve, e.g. a hemispherical or tapered shape in the section comprising the valve opening which is configured to easily receive the ball can also be applied to this embodiment in order to provide a more effective seal. This embodiment may be a separate component, manufactured separately and fixed in place into the printer table. In some examples, it may be 3D printed or machined.

Also disclosed herein is a printer table for supporting a substrate during a printing operation, comprising: a substrate support surface comprising a plurality of apertures; a plurality of ball valves arranged in fluidic connection with the apertures, each of the ball valves comprising a valve opening and a ferromagnetic ball, wherein each of the ball valves has an open configuration and a closed configuration; a negative air pressure source configured to apply a negative air pressure through the plurality of ball valves to the plurality of apertures; and an electromagnet configured to selectively move the ferromagnetic ball in relation to the valve opening to selectively place the ball valve in the closed configuration or the open configuration.

An electromagnet is used to provide an attractive force on the ferromagnetic ball when the electromagnet is turned on. The electromagnet can be moved, and the ferromagnetic ball will move with it, and be positioned where desired. For example the electromagnet can position the ball away from the valve opening, for example to the side. The electromagnet can then be turned off, at which point the attractive force is removed and the ball drops due to its weight into a holding position.

In places where an aperture is to be covered by a substrate, the electromagnet positions the ferromagnetic ball away from the valve opening, such that the ball valve is in the open configuration. Optionally, the printer table further comprises a well for supporting the ball when the ball valve is in the open configuration. In this case, the electromagnet positions the ball above the well and releases it. The well retains the ball away from the valve opening. In other examples, the well may be another receiving means for the ball such as a ledge or a hemispherical element that provides a secure platform, reducing the chances of the ball unintentionally falling into the valve opening, and closing the valve. Any ledge may be inclined away from the valve opening such that the ball is biased to remain on the ledge, and would have to overcome a slope to reach the valve opening.

In places where an aperture is not to be covered by a substrate, the electromagnet moves the ferromagnetic ball towards the valve opening, such that the ball valve is in the closed configuration. When an aperture is not covered by a substrate, it is desirable for the ball valve to be closed to prevent the loss of negative air pressure, as described above. To achieve this, the electromagnet is configured to move the ferromagnetic ball to the valve opening such that the ball valve is in the closed configuration. The electromagnet may be turned on, attracting the ball, which may be resting in the well, and moves it to over the valve opening where it releases it. After being released, the ball falls towards the valve opening. The negative air pressure applied to the ball valve causes a pressure differential across the ball valve. The pressure differential causes the ferromagnetic ball to form a seal against the valve opening when the ferromagnetic ball is positioned at the valve opening.

When the valve is open, the negative air pressure acts to retain a substrate placed on the substrate support surface against the apertures. When the electromagnet positions the ball against the valve opening such that the valve closes, the aperture is closed from the negative pressure source, allowing the aperture to be isolated and preventing a reduction in efficiency of the negative pressure source applied to other closed apertures. This provides a better holding mechanism of the substrate to the support surface of the printer table.

Optionally, the printer table further comprises programming means configured to program the operation of the electromagnet, including its movement across the table and the positions at which it is switched on. The electromagnet can be moved automatically to open and close the valve. For example, a programmable control system may be provided. This control system is configured to turn the electromagnet on and off, and move the ferromagnetic ball to the desired location, whether the valve is required to be open or closed. This control system may receive an input of information regarding the desired state of each valve, for example which valves should be closed and which valves should be open. In another example, the control system may determine which apertures are covered by a substrate, and which are uncovered, and then automatically close the necessary valves. In other examples, the electromagnet may be manually operated such that the ferromagnetic ball can be moved to the valve opening when an aperture is left uncovered by a substrate.

The electromagnet can be automatically operated such that it moves the ferromagnetic ball from a first position to a second position, wherein the second position is above the valve opening and the first position is away from the valve opening, for example in a well to the side. In some examples, the electromagnet may be operated by robotic means, and programmable. For example, a computer may be used to program the movement of the electromagnet, wherein the movement may then occur automatically. The user may input which apertures are uncovered, and a computer will cause the electromagnet to close the respective valves by moving the ball to the valve opening. The electromagnet can also be turned on and off manually or automatically. For example, existing axes of the printer can be used to move the electromagnet.

In some cases, a computer model may be formed of the printer table and the substrates to be printed. For example, the size, shape, and position of substrates on the table may be inputted into a model. This will then calculate which apertures will remain uncovered, without user input. In other examples, a camera may be used to detect which apertures are uncovered, for example from above the printer table. Optionally, the electromagnet may the automatically close the necessary valves in the manner described above.

In some embodiments, the printer table may comprise sensing means to detect if an aperture is covered by a substrate. This information can then be sent to the electromagnet control system which confirms that the correct apertures are closed, determines whether further valves need to be closed, and optionally closes these valves automatically. In some cases, the programming means is configured to receive the data from the sensing means and program the electromagnet based on the data received from the sensing means.

In some examples, several electromagnets may be provided, where each electromagnet is controllable and is configured to open and close at least one ball valve. For instance, each region of apertures may comprise a single electromagnet to open or close the necessary valve in that region. In other cases, multiple electromagnets may be used to reduce the time required to open and close the valves, improving the efficiency of the masking process.

Other features may be implemented in conjunction with either of the previous aspects of the invention.

The seal between the ball and the valve opening is formed such that airflow through the ball valve (between the ball and the valve opening) is substantially restricted, if not completely stopped. Optionally, the valve opening has a complementary shape to the ball. For example, if the ball is substantially spherical, then the valve opening may comprise a shape to receive the ball and form a tight seal, for example a hemispherical concave shape. In other cases, the valve opening need not be a complementary shape to the ball, as long as the ball is able to form a seal against the valve opening. In some examples the aperture may be a cylindrical tube which narrows towards the valve opening such that the ball wedges in the aperture as the diameter of the tube reduces to the diameter of the ball, forming a seal. It is expected that the person skilled in the art would understand that the shape of the ball and valve opening may be any pair of complementary shapes such that the ball wedges into the valve opening, forming a seal. For example a ledge may be provided, surrounding the valve opening upon which the ball can rest. In this manner, the valve opening may be a small hole which can be covered by the ball. In other examples, the ball may be a different shape to a sphere, for example a wedge shape, where the wedge shape is adapted to fit into a tapered valve opening, forming a seal.

Optionally, each ball valve is in fluidic connection with a single aperture. In this case, each aperture comprises a ball valve between the aperture and the negative pressure source. In other cases, each ball valve is in fluidic connection with a plurality of apertures. A plurality of apertures may be connected via a common duct to a single ball valve. In this case, several apertures, such as a region of apertures or a line of apertures are connected to the same, single, ball valve. For example, the printing table surface may be divided into regions that are each connected to a respective ball valve. In this example, a region containing a plurality of apertures may be controlled by a single ball valve.

The skilled person will be aware of common substrate configurations for printing; they may therefore choose to group apertures and connect them to a single ball valve. These groups can vary in number of apertures and configuration of apertures on the support surface. These groups can vary across the support surface, for example, one embodiment has larger groupings near the centre of the table, which are often covered by a substrate, and smaller groupings nearer the edge regions. For example, the centre of the table may comprise groupings of a large number of apertures connected to a single ball valve, for example arranged in a square grid. Around this, towards the perimeter of the table, towards where the edge of a substrate may lie, the groupings may be smaller, providing greater control over which apertures are open and which are closed. For example, this may comprise a line of apertures. In other embodiments where rectangular substrates are used, the groupings may exist as successively larger rectangular shapes, wherein each rectangular strip is independently controllable by a ball valve.

This enables finer control of apertures close to the boundary of a substrate, for example. In this manner, greater control over which apertures are opened and which apertures are closed can be achieved. In one embodiment, a large region of apertures towards the centre of the substrate is connected to a single ball valve as less flexibility is required, and this region of apertures are required to either be open or closed at the same time. This can assist with holding the edges of the substrate more precisely, the importance of which is explained above.

Once the required negative pressure is reached, the substrate can be printed on. The magnitude of the negative pressure at this point may be predetermined based on at least one of the following: substrate dimensions, aperture size, aperture separation, proportion of support surface covered by substrate, substrate weight, and/or porosity of the substrate. The negative pressure required may also be based on the strength of the biased ball valve. The negative pressure source must be capable of exceeding the threshold pressure differential such that it can overcome the bias and close the ball valve for apertures that are not covered. For example, in the case where the ball valve is biased with a spring, the negative pressure could be based on the strength of the spring.

After the printing operation is complete, the substrate is removed from the support surface. Optionally, the negative pressure source is configured to apply a positive pressure to the plurality of apertures. As well as pushing against the substrate for valves that were open, the positive pressure also ensures the reopening of all the ball valves that were previously sealed due to the connected apertures being uncovered. This resets the table, ready for the application of the next substrate for printing.

Also disclosed herein is a method of manufacturing a printer table for supporting a substrate during a printing operation, the method comprising: providing a substrate support surface comprising a plurality of apertures; arranging the apertures such that a substrate placed on the printer table covers at least one of the apertures; providing a plurality of ball valves arranged in fluidic connection with the apertures, each of the ball valves having an open configuration and a closed configuration; arranging the plurality of ball valves to be biased to the open configuration; and coupling a negative air pressure source to the plurality of apertures via the plurality of ball valves.

In cases where an irregular shape substrate is used, a region of apertures around the substrate may remain uncovered. Providing ball valves in fluidic connection with the table apertures enables selected apertures to be closed by moving the ball valve to the closed configuration, hence enabling those apertures that are not covered by a substrate to be closed. This can improve the efficiency of the negative air pressure source, and improve the effectiveness of holding the substrate against the support surface where required.

Providing a biased ball valve allows the valve to remain open when a substrate is covering an aperture, and to close when a substrate is not covering an aperture due to the negative pressure. The negative air pressure holds the substrate on the support surface at apertures that are covered, while allowing apertures to seal automatically when they are not covered by a substrate, enabling straightforward automatic masking of any apertures not covered by the substrate. This can also act to increase the efficiency of the negative air pressure source, and increasing the effectiveness of holding the substrate in position on the table.

Preferred features of the apparatus aspects described above could also be applied to the present method.

Also disclosed herein is a method of masking a printer table for supporting a substrate during a printing operation, the method comprising: providing a substrate support surface comprising a plurality of apertures; arranging the apertures such that a substrate placed on the printer table covers at least one of the apertures; providing a plurality of ball valves arranged in fluidic connection with the apertures, each of the ball valves comprising a valve opening and a ferromagnetic ball, wherein each of the ball valves has an open configuration and a closed configuration; applying an electromagnet to selectively move each ferromagnetic ball in relation to its respective valve opening to selectively place the ball valve in the closed configuration or the open configuration; and coupling a negative air pressure source to the plurality of apertures via the plurality of ball valves.

Optionally, when an aperture is covered by a substrate, the electromagnet positions the ferromagnetic ball away from the valve opening to place the ball valve in the open configuration. In other cases, when an aperture is not covered by a substrate, the electromagnet moves the ferromagnetic ball to the valve opening to place the ball valve in the closed configuration. Optionally, the electromagnet moves the ball to a well for supporting the ball when the ball valve is in the open configuration. For example, the well may comprise a ledge or a hole for supporting the ball and retaining the ball away from the valve opening such that the ball is held away from the valve opening.

The negative air pressure applied to the ball valve causes a pressure differential across the ball valve. In some cases, the pressure differential causes the ferromagnetic ball to form a seal against the valve opening when the ferromagnetic ball is positioned at the valve opening. The negative air pressure acts to retain a substrate placed on the substrate support surface against the apertures. In some embodiments, the valve opening has a complementary shape to the ball. In some examples, each ball valve is in fluidic connection with a single aperture. However, in other examples, each ball valve is in fluidic connection with a plurality of apertures. Optionally, the negative pressure source applies a positive pressure to the plurality of apertures.

Optionally, the electromagnet is programmable by a computer. For example, a computer may be used to determine the movement of the electromagnet, in particular the necessary movement to position the ferromagnetic ball against the valve opening, or away from the valve opening (e.g. in a well). The electromagnet may also be programmed when to turn on and attract the ball, and when to turn off and drop the ball when positioned correctly.

Optionally, the electromagnet is programmed to move a ball valve to the open position if the corresponding aperture is covered by a substrate, and move a ball valve to the closed position if the corresponding aperture is not covered by a substrate. For example, if a substrate covers an aperture, then the electromagnet may be programmed to move the ferromagnetic ball away from the valve opening, or ensure that the ball is positioned away from the valve opening, such as in a well to hold the ball. If a substrate does not cover an aperture, the electromagnet may be programmed to move the ball to the valve opening, allowing the ball to form a seal and close the valve. The electromagnet may be programmed to perform this for each ball valve on the printer table. In other cases, multiple electromagnets may be programmed to perform this action for a group of ball valves, for example corresponding to a region of apertures.

Optionally, a sensing means detects if an aperture is covered by a substrate. For example, each aperture may comprise a sensor to detect if a substrate covers the aperture. In other examples, a camera may be used to detect which apertures are covered. This sensor data may then be sent to a computer which programs the electromagnet. Optionally, the electromagnet is programmed to move the ball based on the data from the sensing means. For example, if a sensor detects if an aperture is covered, this can be fed to the computer which controls the electromagnet. The electromagnet is then programmed to move the ball to open the valve if the aperture is covered, and move the ball to close the valve if the aperture is uncovered. For example, this may be performed after a substrate has been laid on the printer table.

Optionally, a computer model is generated of which apertures are to be covered by a substrate, optionally wherein the electromagnet is programmed move the ball based on the data from the model. For example, a computer model may determine which apertures will be left uncovered when a particular substrate is positioned on the printer table. This information can then be fed to the computer which programs the electromagnet and used to determine the movement of the electromagnet. For example, if the model determines that an aperture will be uncovered when a substrate is to be placed on the table, then this can be used to cause the electromagnet to move the ferromagnetic ball to the valve opening to close the valve.

A selection of specific examples will now be described in detail to illustrate some of the effects of the system and method described herein, with reference to the Figures, in which.

Figure 1:
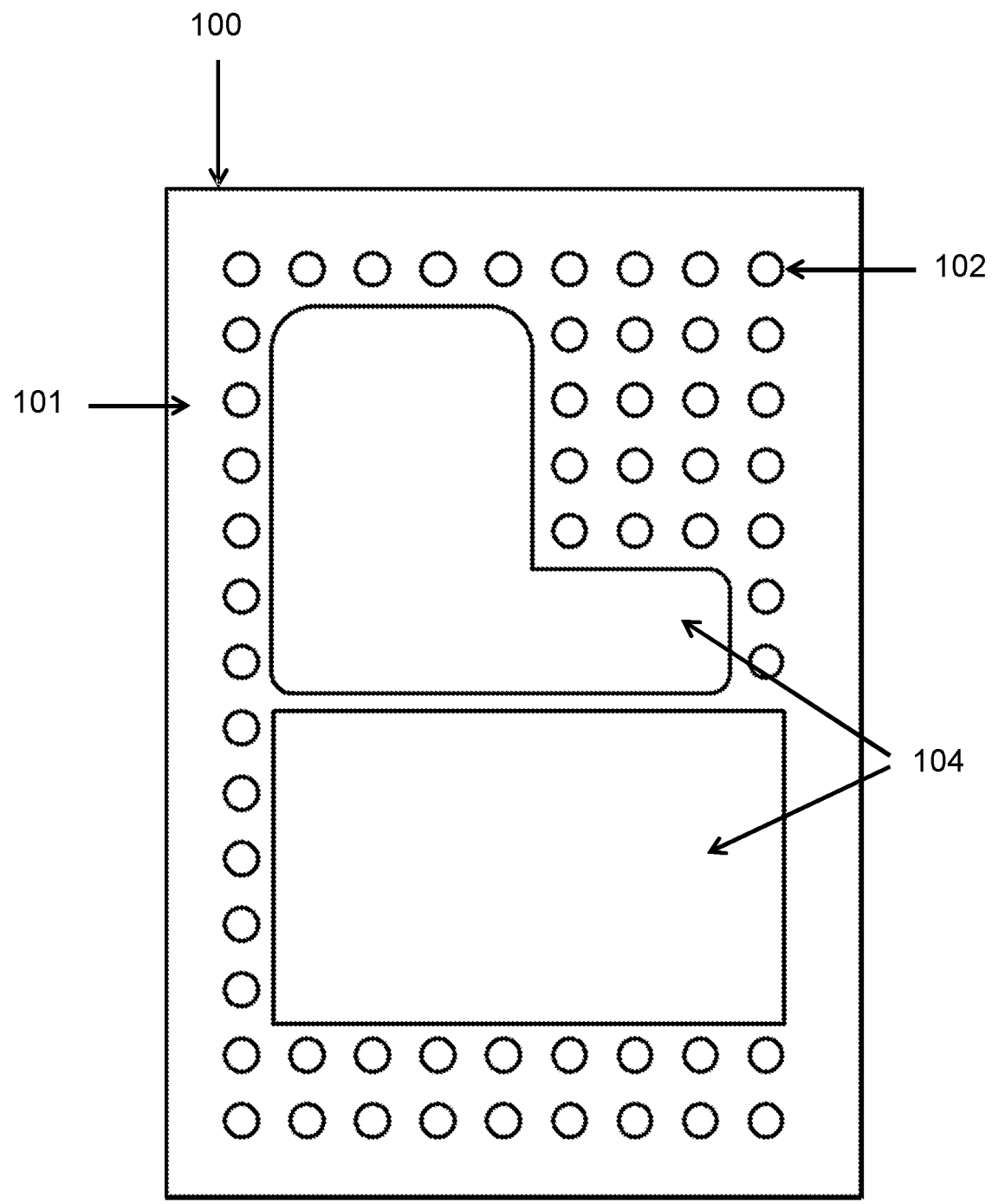
FIG. 1 shows a printing table with substrates partially covering the printing table, according to one embodiment.

FIG. 1 shows an example of an upper support surface of a printer table 100. In the arrangement shown in FIG. 1, the apertures 102 are arranged in a generally square and periodic grid, although other arrangements are possible. The apertures 102 extend across the whole of the upper surface of the table 100 except for an edge region 101 around the perimeter of the table where there are no apertures. In FIG. 1, the size of the apertures has been increased significantly for clarity and to illustrate the principle of the system. The size and spacing of the apertures 102 will be much smaller in an actual implementation. Moreover, the arrangement of apertures may be different for a particular implementation and the size, spacing and aperture arrangement may be optimised to provide the necessary suction to hold substrates to the printing table 100 depending on the application. The apertures 102 are shown as circular shapes, however any shape is envisaged.

FIG. 1 also shows two substrates 104, resting on the support surface 100. Accommodating at least one substrate 104, which may be an irregular shape, means that some of the apertures 102 are covered while others are not. Many printing instances will consist of printing on one or more substrates that are smaller than the table. This leaves some apertures on the support surface uncovered which, when the negative pressure is applied to the apertures 102, could require an increased power of the pressure source to reach the required pressure at the apertures for holding the substrate.

Figure 2:
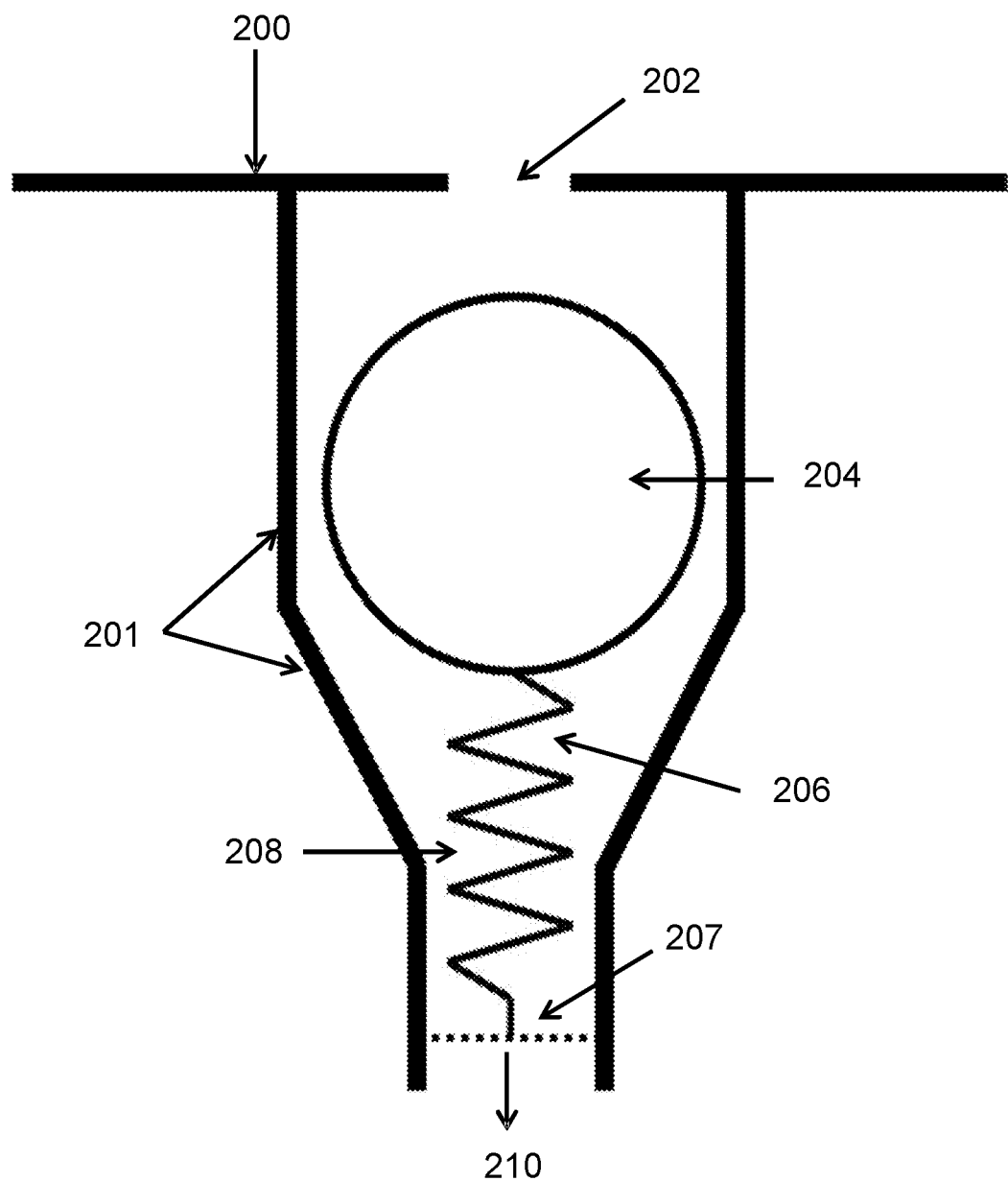
FIG. 2 shows a biased ball valve, according to one embodiment.

FIG. 2 shows a cross-section of an example embodiment of a self-sealing ball valve within the printer table, when no pressure is applied to it. The support surface 200 of the printer table is shown to have an aperture 202. The aperture may be much smaller than the diameter of the ball valve, and is shown not to scale in FIG. 2 for illustrative purposes, although in a real example the aperture may be much smaller. The ball valve comprises walls 201 to hold the ball 204 and in some cases, and as shown in FIG. 2, biasing means 206. The walls 201 of the ball valve may be tapered in places, for example. Below the ball 204, the walls may narrow to a point referred to as the valve opening 208, which will be closed if the ball 204 forms a seal against the walls 201.

In this example, the ball valve comprises a ball 204 and biasing means 206, which in this case is a weak spring. The spring 206 is shown in FIG. 2 to be held in position by being attached to a biasing means support 207, for example a ledge in FIG. 2, which is non-continuous and does not extend over the entirety of the cross-sectional area of the ball valve, and is represented as a dashed line. The biasing means support 207 does not form an airtight seal in the valve, allowing the flow of air through the valve. Other embodiments of supporting the biasing means 206 are envisaged. The ball 204 is of a slightly smaller diameter than the valve, such that in the open configuration air can pass from the aperture 202 around the ball 204 and through the valve opening 208. The ball 204 rests upon the spring 206, such that the tension in the spring 206 biases the ball 204 away from the valve opening 208. The spring 206 must be configured to support the weight of the ball 204 such that it does not compress significantly under the weight of the ball 204, and instead ensures that the valve remains open. Without the biasing means 206, the ball 204 would rest against the walls of the valve, sealing the valve opening 208. A negative pressure can be applied by a negative pressure source, which is located beyond the valve opening 208, and is not shown in FIG. 2. The direction towards the negative pressure source is denoted by labelled arrow 210. For example, the negative pressure source is connected to the valve opening 208 by pipework or any kind of airtight connector.

Figure 3:
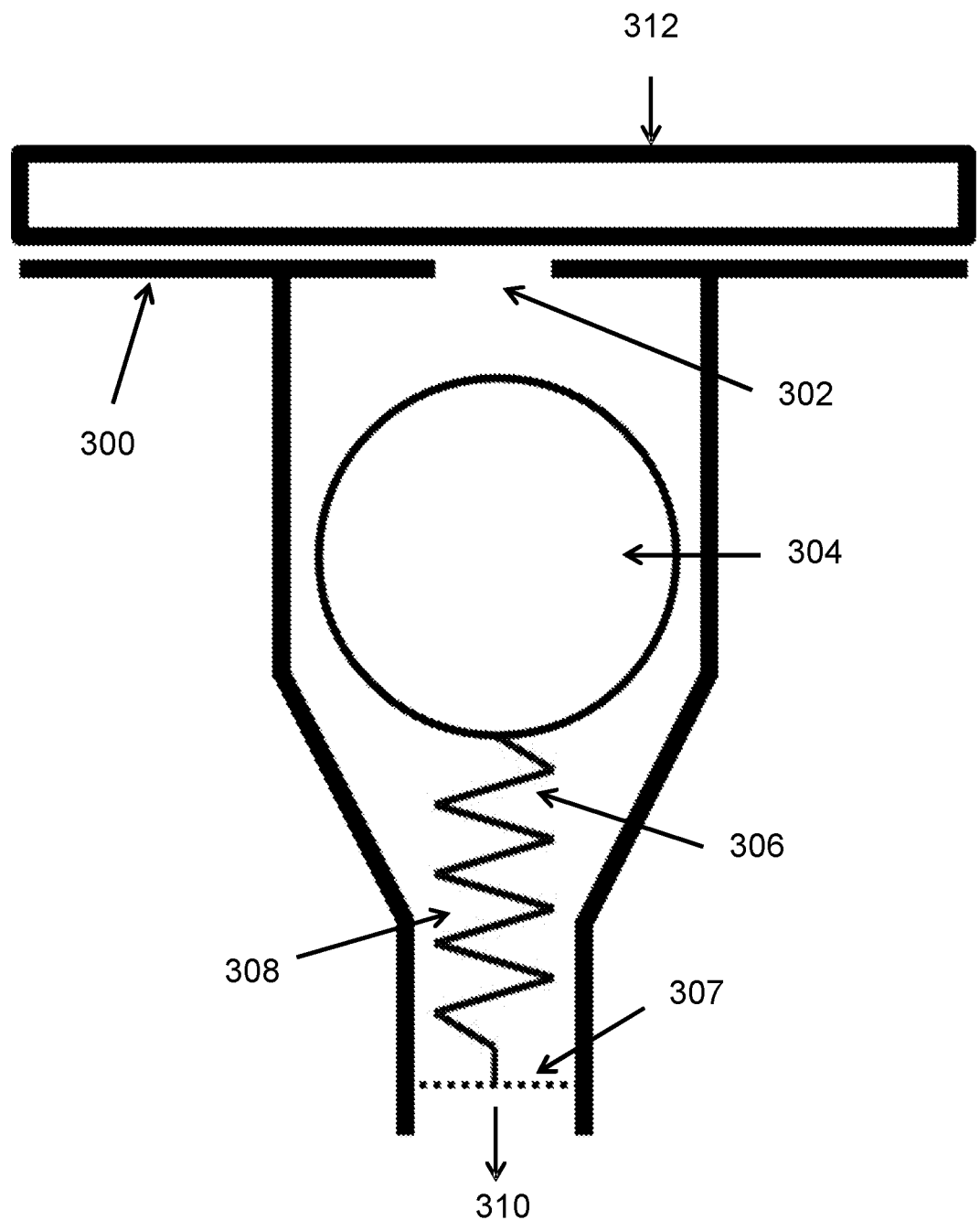
FIG. 3 shows a biased ball valve in the open configuration, covered by a substrate, according to one embodiment.

FIG. 3 shows an example embodiment of the self-sealing ball valve of FIG. 2 with a substrate 312 placed on the support surface 300. Substrate 312 covers aperture 302 such that the ball valve and aperture 302 are sealed from the outside atmosphere. As in FIG. 2, the ball valve of FIG. 3 comprises a ball 304 and a biasing means 306 to bias the ball 304 away from the valve opening 308. The biasing means 306 is supported by a biasing means support 307. A substrate 312 is placed onto the substrate support surface 300 when the system is ready for printing. The negative pressure will then be slowly increased to provide a suction force to hold the substrate 312 in place. There is a significantly reduced air flow through the aperture to the outside atmosphere due to the substrate placed over the aperture. This means that as the negative pressure is slowly increased by the negative pressure source (which is located towards arrow 310), the pressure at both the valve opening 308 and at the aperture 302 begins to decrease due to air flow through the open valve. Due to this, the pressure at the valve opening 308 is substantially equal to the pressure at the aperture 302. Accordingly, the pressure differential is zero, negligible, or at least below a threshold required to overcome the biasing means 306. Therefore, the valve remains open and the negative pressure retains the substrate 312 against the surface 300.

Figure 4:
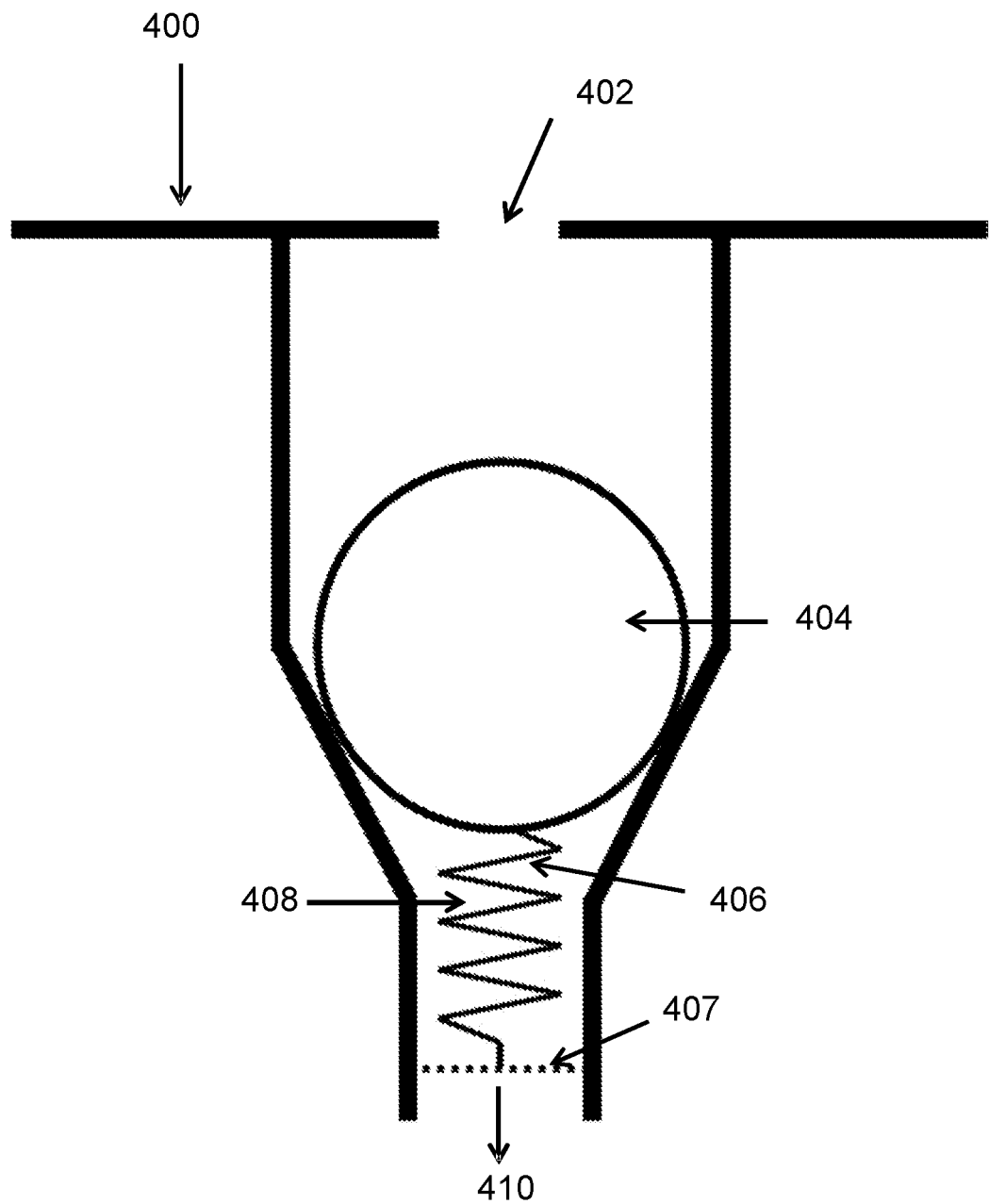
FIG. 4 shows a biased ball valve in the closed configuration, not covered by a substrate, according to one embodiment.

However, some apertures may not be covered by a substrate during printing. For example, FIG. 1 shows that some apertures may remain uncovered by a substrate due to differing shapes and sizes of substrates being printed. FIG. 4 shows an example embodiment of the same ball valve as FIGS. 2 and 3, but with a negative air pressure applied in the absence of a substrate 312 covering the aperture 402. FIG. 4 shows an uncovered aperture 402 in support surface 400. The ball valve also comprises a ball 404 and biasing means 406 supported by biasing means support 407. A negative pressure source is not shown in FIG. 4, but is located in a position in the direction of arrow 410, beyond the valve opening 408.

As the negative pressure is increased, the pressure at the valve opening 408 begins to decrease, while the pressure at the aperture 402 remains substantially constant due to the airflow around the top of the aperture 402 maintaining atmospheric pressure. Therefore, a pressure differential occurs across the ball valve which increases as the negative pressure from the pressure source is increased. The pressure differential exerts a force on the ball valve due to the frictional force from the air that flows from the aperture 402 to the valve opening 408. This force acts in an attempt to pull the ball 404 towards the valve opening 408 and seal the valve. This force competes with the biasing force provided by the biasing means 406, which in this example would be the tension in the spring. While the magnitude of the negative pressure is low and the pressure differential is small, the biasing force is great enough to maintain the ball valve in the open configuration. When this pressure differential exceeds a threshold limit, the force generated by the pressure differential is great enough to overcome the biasing force. In this example, the spring 406 is compressed as the ball 404 is pulled towards the valve opening 408. As the ball 404 moves, it forms a seal against the walls of the ball valve at the valve opening 408 such that air cannot pass through the valve opening 408, thereby closing the valve. As shown in FIG. 4, the spring 406 is compressed and a seal is formed with the tapered sides of the valve.

Figure 5:
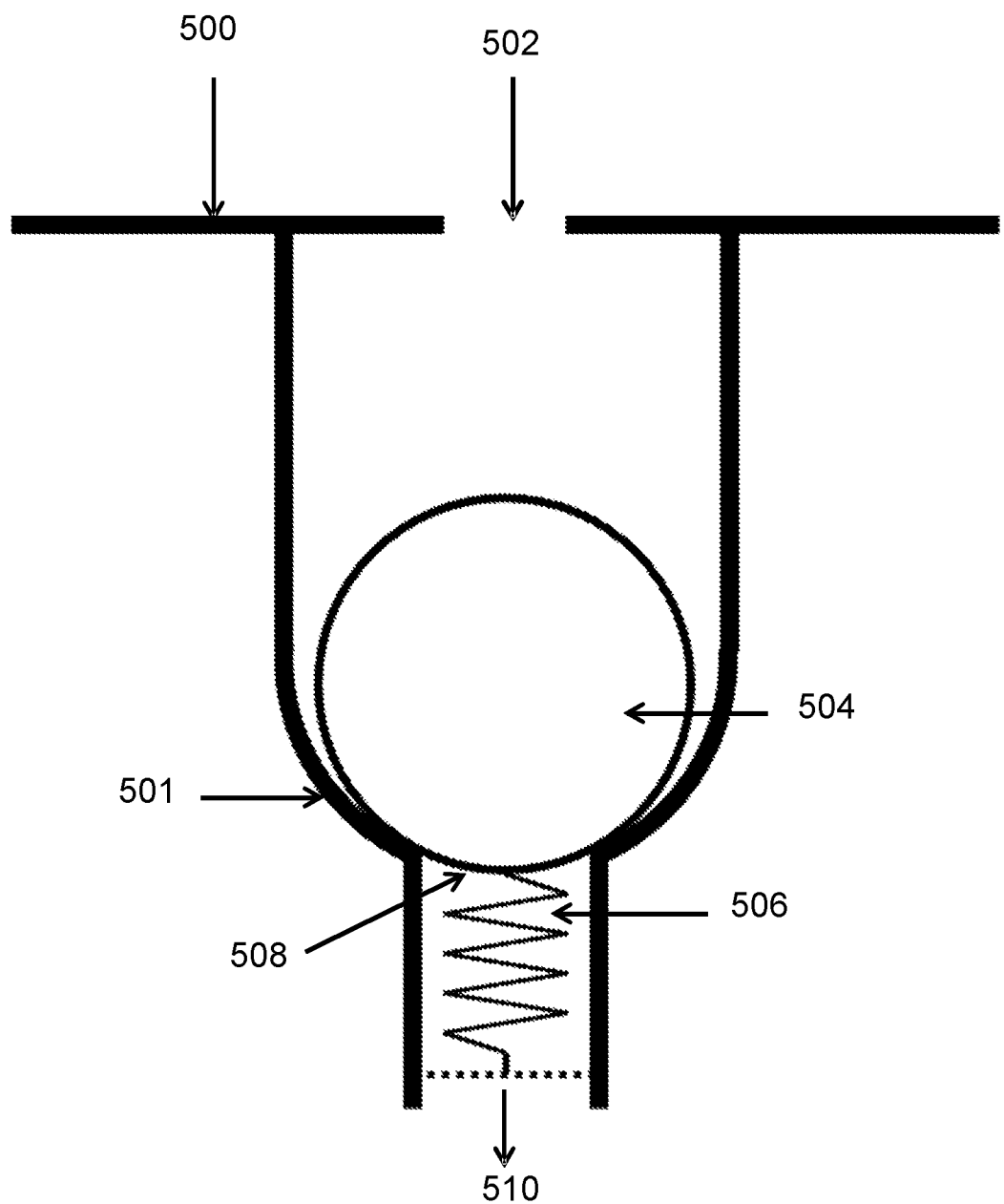
FIG. 5 shows a biased ball valve with a hemispherical shape, according to one embodiment.

Other embodiments are envisaged that provide different examples of sealing the valve in the manner described above, but with different geometries of valve openings. For example, FIG. 5 shows a ball valve in the closed configuration as in FIG. 4, but with a different shape of the walls of the valve 501 and the valve opening 508 such that the ball forms a seal in an alternative manner. In this example, the aperture 502 in the support surface 500 is exposed and not covered by a substrate. A negative pressure is applied by a negative pressure source located towards arrow 510 in the same way as above. When the pressure differential exceeds the threshold limit, the force due to the pressure exceeds the biasing force of the biasing means 506, such that the ball 504 is pulled towards the valve opening 508. In this example, the bottom of the valve wall 501 is curved in a complementary fit to the ball 504. This may, for example, be a hemispherical concave shape for receiving a sphere of substantially the size of the ball 504. As the biasing means 506 is compressed and the ball 504 moves further down the aperture 502 towards the valve opening 508, it approaches the curved surface 501. This complementary fit secures the ball 504 in position, sealing the valve opening 508 by ensuring that all parts of the valve opening 508 are covered by the ball 504, and preventing any gaps in the seal.

Figure 6:
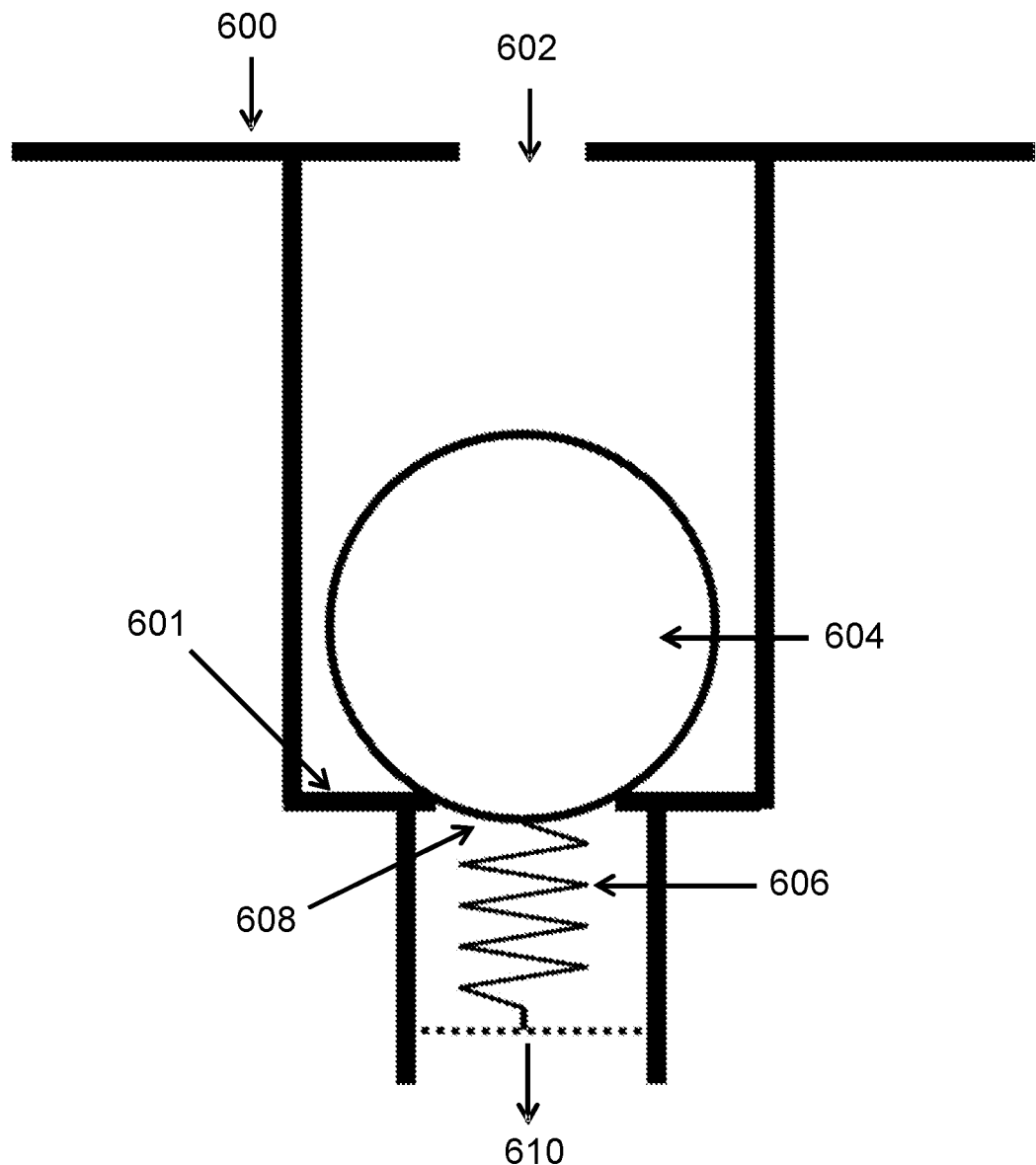
FIG. 6 shows a biased ball valve with a flat-bottomed shape, according to one embodiment.

FIG. 6 shows another example embodiment of a valve, showing part of the valve wall as a flat-bottomed ledge 601. The aperture 602 in support surface 600 is also not covered by a substrate in this example, where a negative pressure is applied from the direction 610. When the subsequent pressure differential exceeds the threshold, the biasing means 606 is compressed, moving the ball 604 towards the valve opening 608. When the ball reaches the flat-bottomed ledge 601, the ball wedges against it and seals the valve opening 608. This will occur assuming the valve opening 608 is significantly smaller than the ball 604. Other embodiments are envisaged involving the sealing of valve openings by wedging the ball against a surface and preventing air from flowing through the valve opening 608, through the valve, and to the aperture 602.

Figure 7:
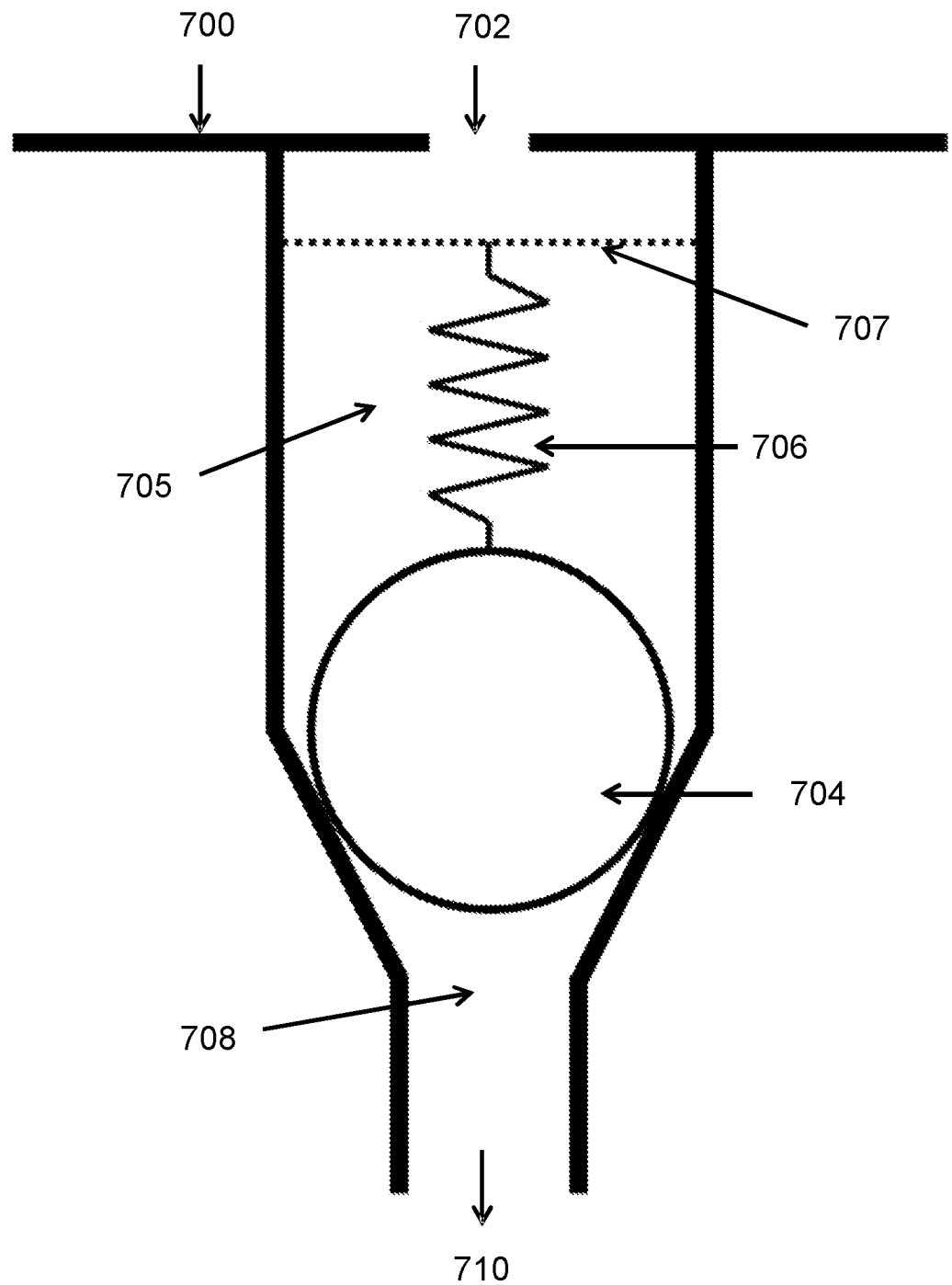
FIG. 7 shows a biased ball valve with a spring suspending the ball, according to one embodiment.

FIG. 7 shows another embodiment of a valve, comprising a biasing means of a tension spring configured to suspend the ball from above. In this example, the spring is configured to extend rather than compress as in previous examples. In the same way as the previous example valves, the aperture 702 is present in support surface 700, which is uncovered. A negative pressure is applied from the direction 710. The ball valve comprises a ball 704 and a tension spring 706, the spring 706 configured to suspend the ball away from the valve opening 708 when no pressure is applied. The spring is fixed by a biasing means support 707 which may, for example, extend from the side of the aperture wall. The support 707 allows air to flow between the ball valve and the aperture opening, while providing a mechanism to attach the spring. For example, this could be a bar extending across the aperture that does not form a complete seal. The biasing means support 707 is shown as a dashed line in the cross-section in FIG. 7 to represent that the support 707 does not form a seal.

When the negative pressure is applied and the pressure differential exceeds the threshold, this provides a force on the ball 704 pulling it towards the valve opening 708. This force acts against the tension in the spring 706, overcoming the biasing force when the pressure differential exceeds the threshold. As such, the spring 706 extends and allows the ball 704 to form a seal against the valve opening 708, closing the valve.

The biasing means in this embodiment may be provided by an alternative arrangement other than a spring, for example by an elastic string. In FIGS. 2-6, the biasing means relies on the compression of the spring, such that the resistive force of the spring biases the ball away from the valve opening, but is compressed under the action of a significant enough force such as when the pressure differential exceeds the threshold, and the valve closes. However, in FIG. 7, the biasing mechanism relies on the tension of the biasing means to support the weight of the ball, which is overcome by the negative pressure, extending the biasing means, allowing the valve to close.

Figure 8:
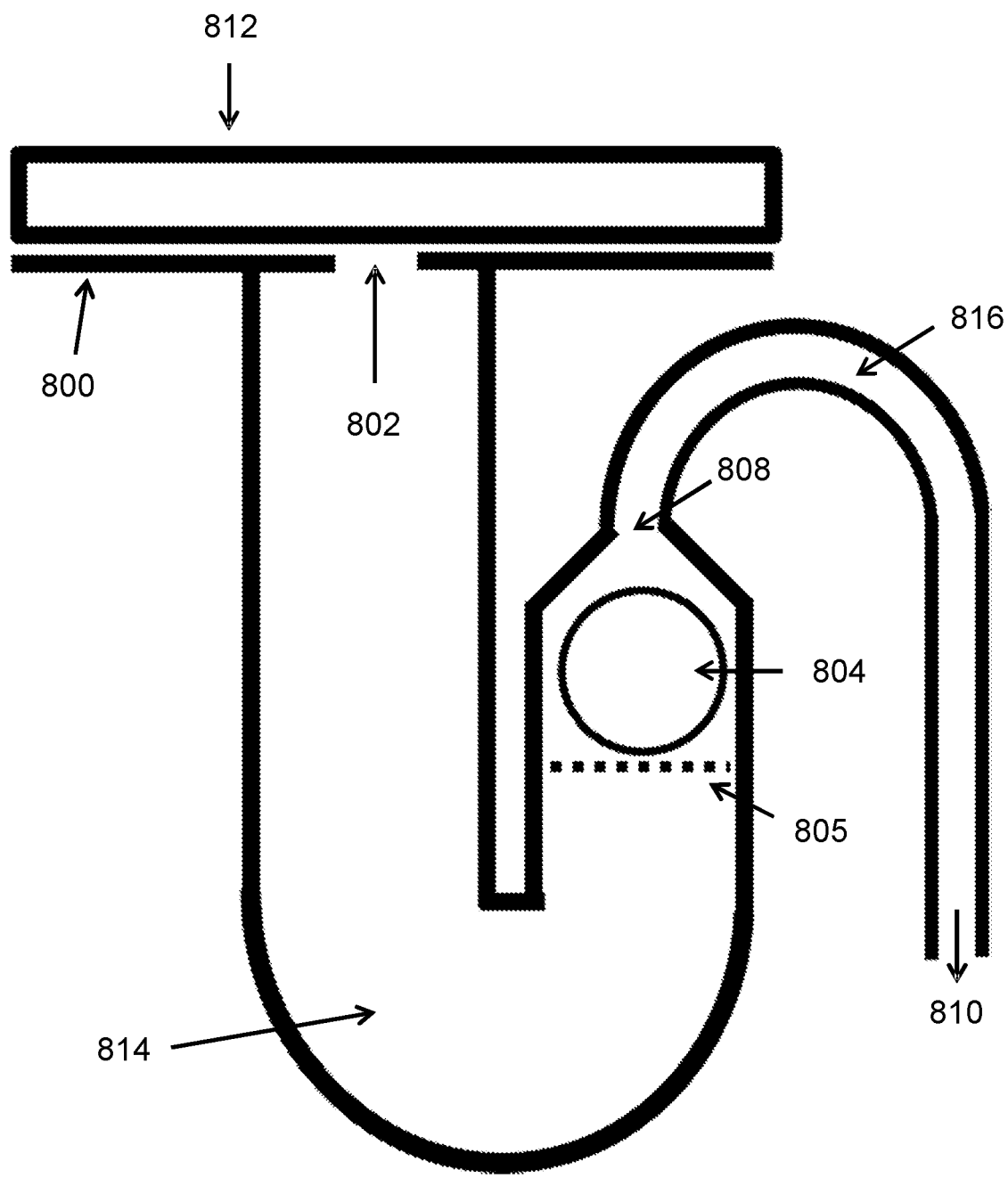
FIG. 8 shows a ball valve biased by the action of gravity on the ball, in the open configuration, covered by a substrate, according to one embodiment.

FIG. 8 shows another embodiment of a self-sealing ball valve, wherein the ball valve is biased to the open configuration by the action of gravity on the ball. FIG. 8 shows an aperture 802 in the support surface 800, which is covered by a substrate 812. A ball 804 is provided which may rest on a ball ledge 805, which may, for example, be a surface extending from the inside wall of the aperture. The valve opening 808 is positioned above the ball 804 such that the weight of the ball 804 positions the ball 804 away from the valve opening 808. The ball 804 is prevented from moving too far away from the valve opening 808 by the ball ledge 805 which provides support to the ball 804. The ledge 805 does not form a seal, and air can move around the ball 804 when the ball 804 rests on the ledge 805. For example, the ledge 805 may comprise two struts from each side of the inside wall of the aperture to hold the ball 804 in position due to its weight, while not preventing air flow.

A negative pressure source is located towards arrow 810, which applies a negative pressure. As the substrate 812 seals the aperture, the pressure at the aperture is the same as the pressure at the valve opening, as in FIG. 3. This causes a pressure differential that is below the threshold, and the ball valve remains in the open configuration.

To assist with the arrangement described, U-bends 814 and 816 may be required to provide the valve opening 808 above the ball 804 such that the weight of the ball 804 biases the ball 804 away from the valve opening 808, and to connect the valve opening 808 to the negative pressure source towards direction 810.

Figure 9:
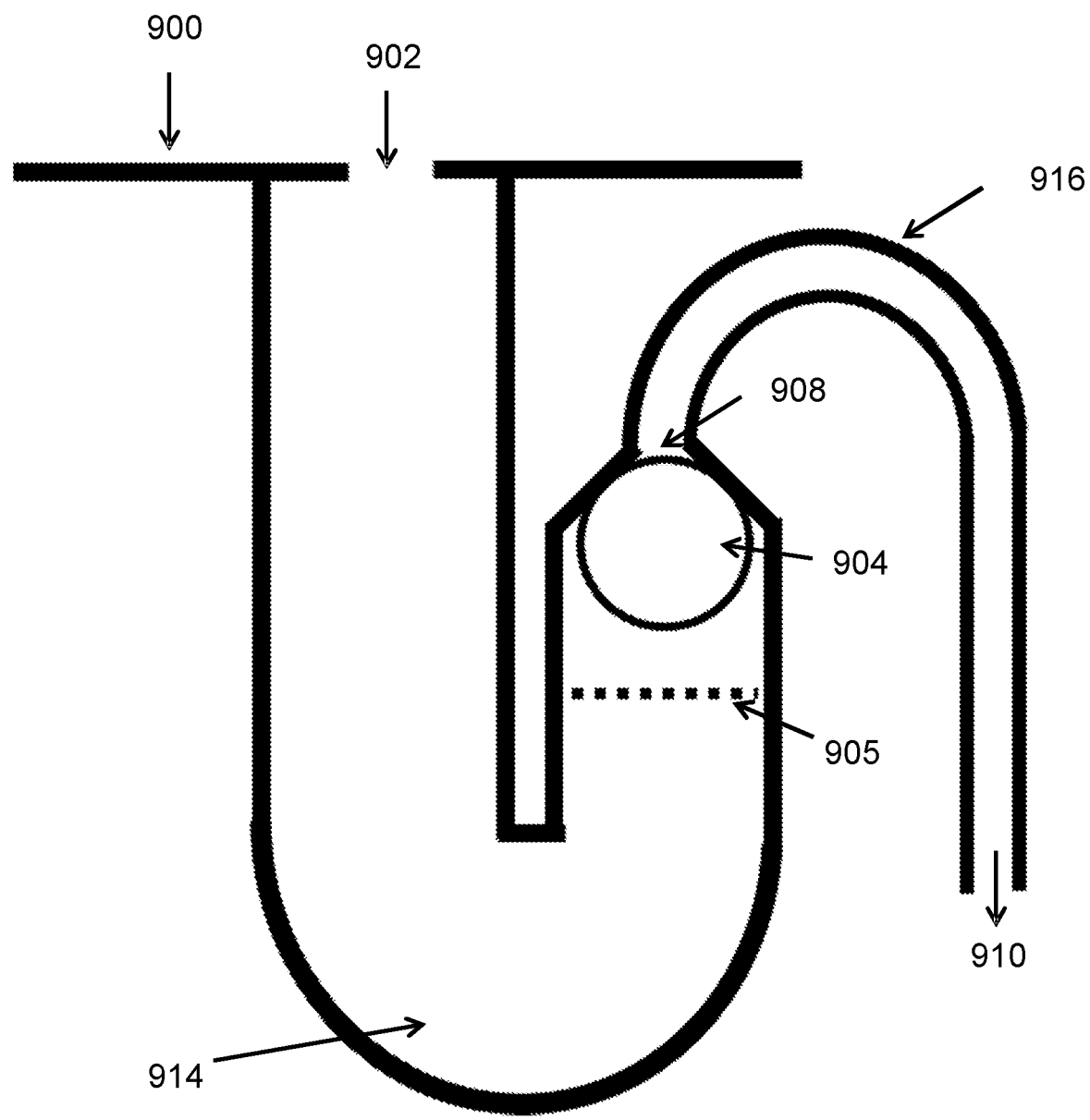
FIG. 9 shows a ball valve biased by the action of gravity on the ball, in the closed configuration, not covered by a substrate, according to one embodiment.

FIG. 9 shows the example embodiment of FIG. 8, but with the ball valve in the closed position due to the absence of a substrate. FIG. 9 shows an aperture 902 within support surface 900 which is uncovered. The negative air pressure applied thus generates a pressure differential in the same way as the previous embodiments that are not covered by a substrate. This pressure differential acts on the ball valve by pulling the ball 904 upwards towards the valve opening 908. When the pressure differential exceeds the threshold, the pressure is sufficient to overcome the weight of the ball 904, and pull the ball 904 away from the ball ledge 905 such that the ball 904 seals the valve opening 908, and closes the valve as shown in FIG. 9. Other embodiments are envisaged that use the weight of the ball to bias the ball away from the valve opening.

Figure 10:
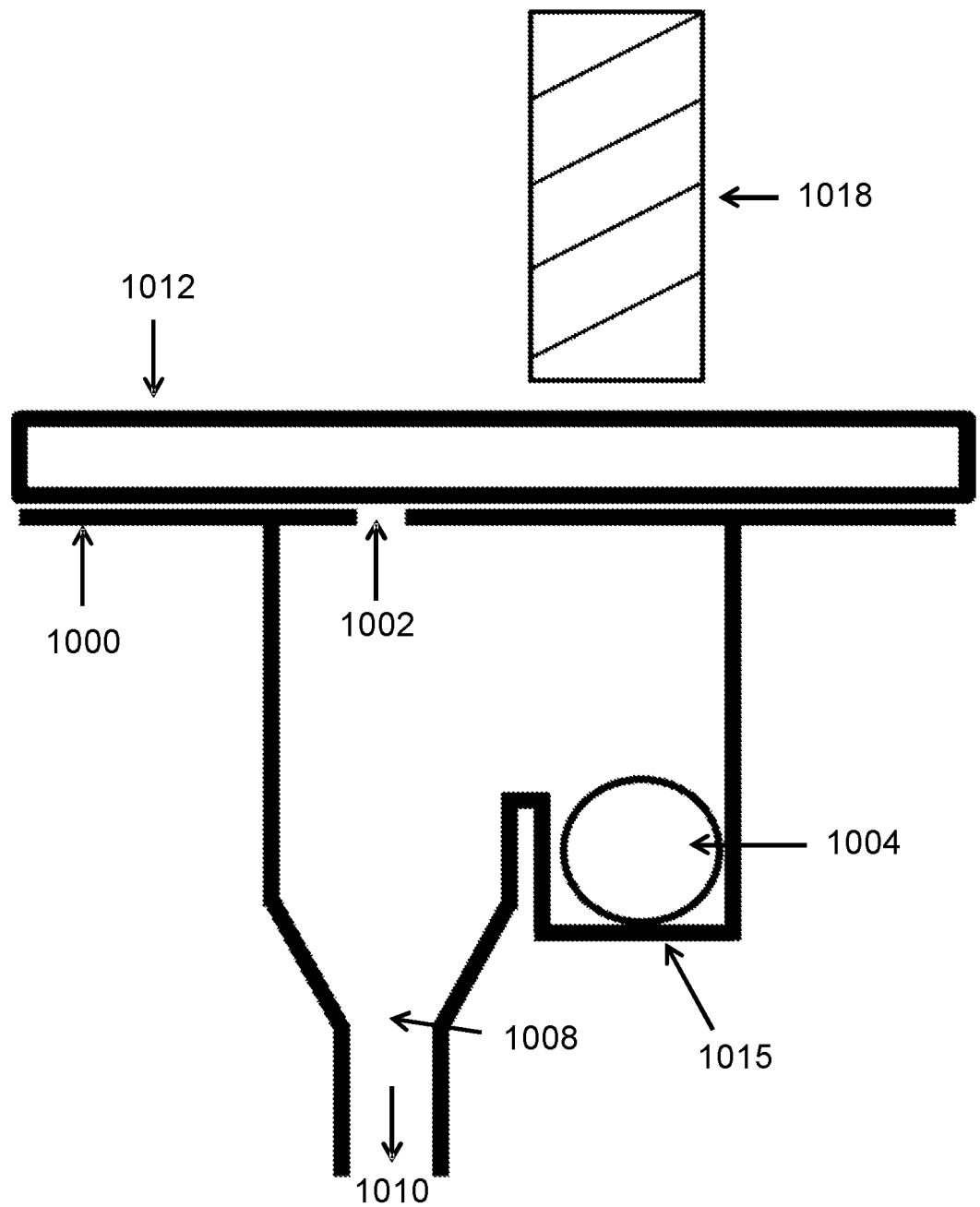
FIG. 10 shows a biased ball valve with an electromagnet and the ball valve in the open configuration, according to one embodiment.

FIG. 10 shows an example embodiment of a ball valve which can be selectively opened and closed through the use of an electromagnet. In the same way as previously, aperture 1002 is provided within the support surface 1000, which is covered by substrate 1012. A ferromagnetic ball 1004 is provided which is supported in a ball well 1015. In this configuration, the ferromagnetic ball 1004 is positioned away from the valve opening 1008, such that the valve is open. In this case, the negative pressure can be applied by a negative pressure source located towards arrow 1010, and provide a suction through the open valve to hold the substrate 1012 on the support surface 1000. An electromagnet 1018 is provided which is configured to selectively move the ferromagnetic ball 1004 in relation to the valve opening. For example, when the electromagnet 1018 is turned on, it is able to attract the ball 1004 such that it can move the ball 1004 as the electromagnet 1018 moves.

Figure 11:
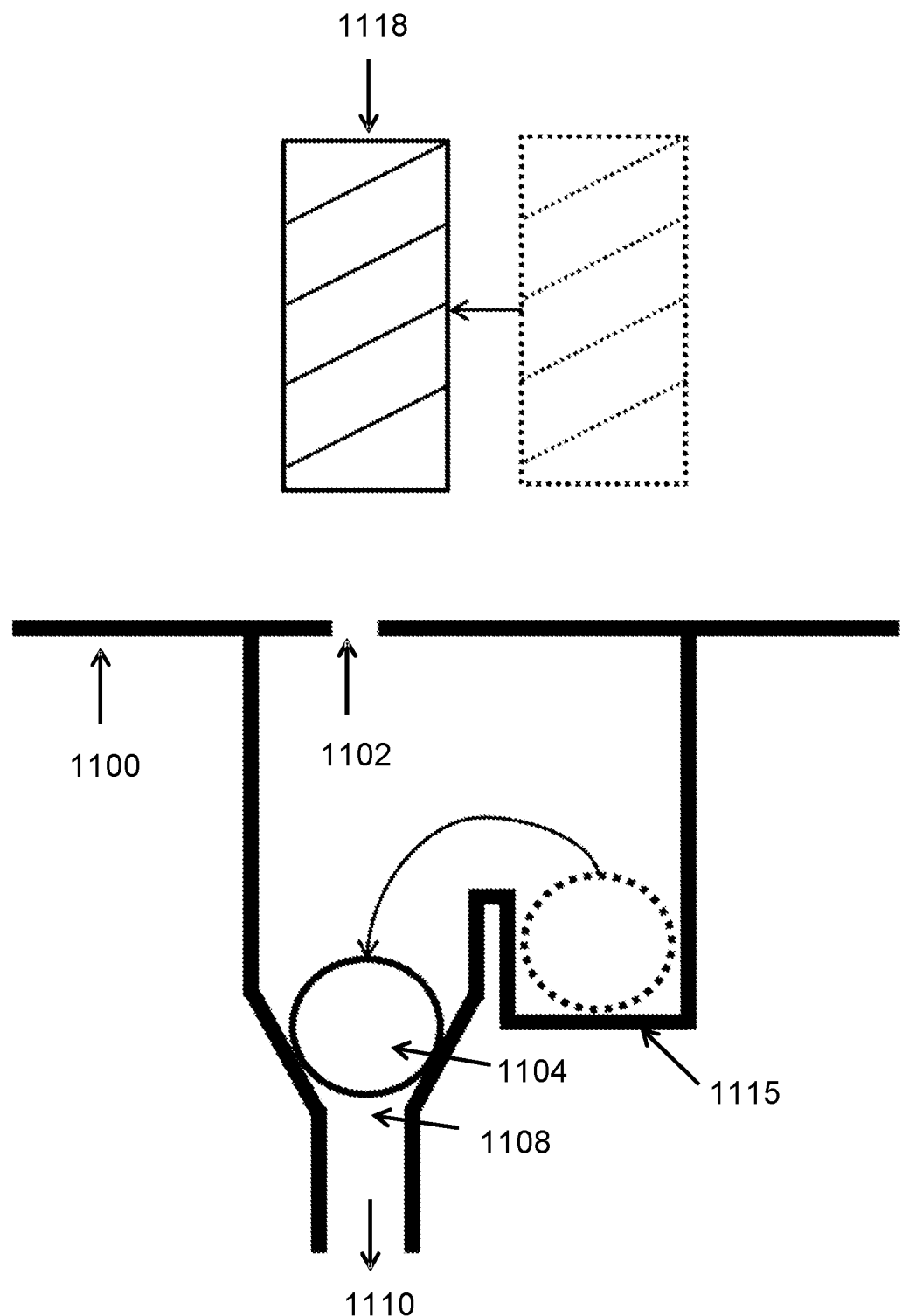
FIG. 11 shows a biased ball valve with an electromagnet placing the ball valve in the closed configuration, according to one embodiment.

FIG. 11 shows the example of FIG. 10, but with the ball valve in the closed position. The aperture 1102 in support surface 1100 is uncovered. FIG. 11 shows the process of the electromagnet 1118 moving the ferromagnetic ball 1104 from the ball well 1115 to the valve opening 1108, such that the valve is moved from an open configuration to a closed configuration. The electromagnet 1118 can apply a magnetic field to attract the ferromagnetic ball 1104, and move it to a desired location, at which point it can turn off the field and release the ball. In this case, it moves it to the valve opening 1108 such that the weight of the ball 1104 closes the valve.

The electromagnet 1118 can be moved automatically to open and close the valve. For example, a programmable control system may be provided (not shown in FIG. 10 or 11). This control system is configured to turn the electromagnet on and off, and move the ferromagnetic ball to the desired location, whether the valve is required to be open or closed. This control system may receive an input of information regarding the desired state of each valve, for example which valves should be closed and which valves should be open. In another example, the control system may determine which apertures are covered by a substrate, and which are uncovered, and then automatically close the necessary valves. In some cases, the electromagnet may move a ferromagnetic ball after the substrate has been positioned, and the valves that require opening or closing have been identified. In other cases, the electromagnet may close the necessary valves before the substrate is laid on the table, based on information predicting which valves will be uncovered by the substrate (for example predicted by a computer model). In other examples, the electromagnet may be manually operated such that the ferromagnetic ball 1104 can be moved to the valve opening 1108 when an aperture 1102 is left uncovered by a substrate.

Figure 12:
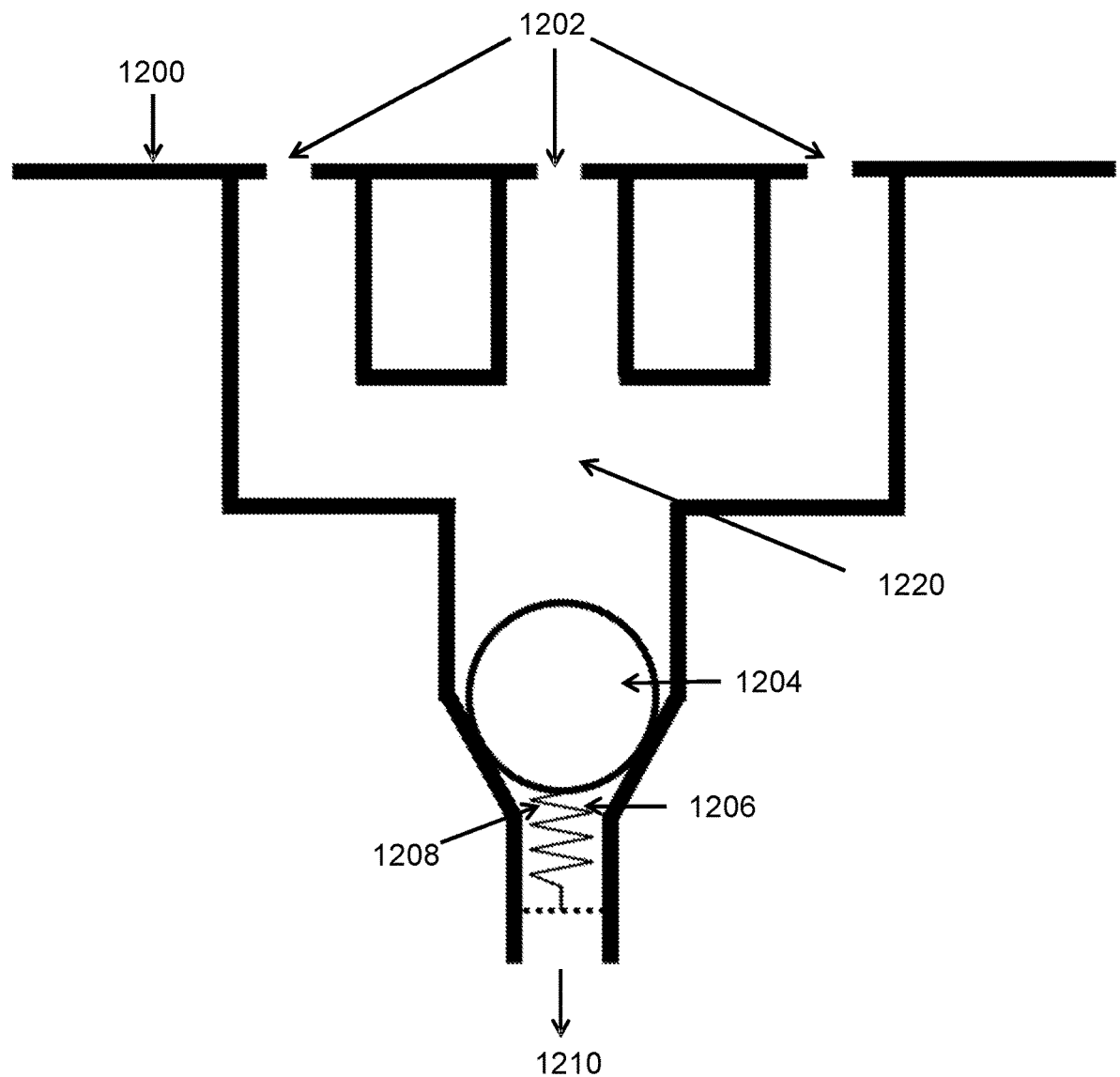
FIG. 12 shows a biased ball valve in fluidic connection with a plurality of apertures in the closed configuration, according to one embodiment.

FIG. 12 shows an example embodiment of the self-sealing ball valve using a spring as a biasing means, wherein the ball valve is in fluidic connection with a plurality of apertures. In the same way as previous embodiments using a spring, a ball 1204 is supported by a spring 1206, biased away from a valve opening 1208. In this example a negative pressure source towards arrow 1210 is not currently applying a negative pressure, meaning that the ball valve is in the open configuration in FIG. 12. Support surface 1200 comprises a plurality of apertures 1202 which are connected to the ball valve by a common duct 1220. In FIG. 12, three apertures are shown to be connected together; however any number may be connected in this way. If a substrate was not covering the apertures, and a negative pressure was applied above the threshold, then the valve would close in the manner described above for the spring-biased ball valve. When the valve is closed, this seals off the negative pressure from each of the connected apertures, in this case three. Therefore, a plurality of apertures may be controlled with a single ball valve. This may be useful for regions of apertures that are all either covered or not covered by a substrate. However, problems may arise when some apertures in the region are covered, and others are not, as the ball valve prevents the negative pressure from reaching all of the connected apertures. For example this may occur on the boundary of the substrate positioned on the printer table. In this case, each ball valve may be in fluidic connection with a single aperture. This allows greater precision and control over individual apertures.

Figure 13:
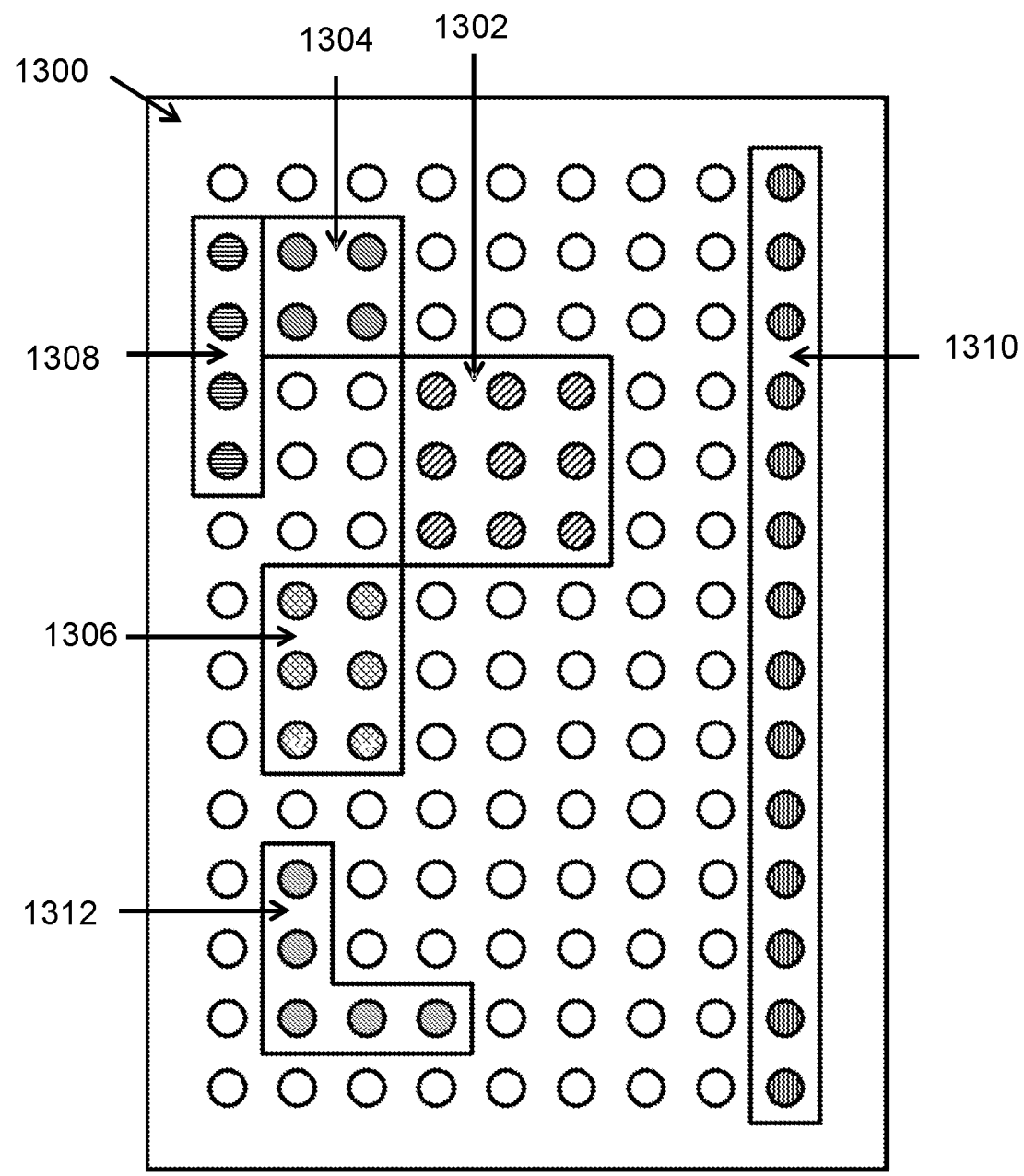
FIG. 13 shows a printing table with example regions of apertures connected to single ball valves, according to one embodiment.

FIG. 13 shows an example support surface 1300 of the printing table. FIG. 13 shows apertures as circles, the apertures arranged in a periodic fashion on the support surface. The various cross hatching patterns of the apertures represents separate groupings of apertures wherein each group is connected to a single mechanical valve. Only examples are shown, and not all apertures are grouped in the Figure. The apertures are shown not to scale for the purposes of illustrating the groupings.

The area that each group of apertures cover defines a region on the printing surface. As can be seen, the number of apertures in a grouping, or defining a region, can vary across the support surface. In this example, a group of apertures in a region 1302 are shown towards the centre of the support surface in groups of nine. This is a larger grouping than towards the edge of the support surface as it is less likely that the edges of a substrate will lie within the region that is defined by these apertures. The outermost area of the support surface is more likely to have the edges of the substrate located within it. This means that the groupings of apertures can be made smaller and therefore define a smaller region on the support surface. This gives better precision to the negative pressure application that holds the substrate to the surface. For example, region 1304 comprises four apertures as it is closer to the edge of the support surface and is more likely to be closer to the edge of the substrate. In this manner, a smaller area can be controlled. Other smaller regions such as 1306 may exist, which comprises six apertures. Even further out towards the edge of the support surface, regions may comprise a single row of apertures. This may, for example, extend along one side of the table as in region 1310, or all around the edge in a rectangular shape. In other examples small sections of single-width aperture regions may be present as in region 1308.

The shape of a region can also be varied, for example the regions are square furthest from the edge regions, such as 1302 and 1304. This may vary across the support surface to include rectangles such as region 1306, lines in regions 1308 and 1310, as well as "L shapes" such as region 1312, but could include any other 2D shape that can be formed from a selection of apertures. The size and shape of regions can vary as shown, with larger regions at the outer areas of the support surface, or be selected to provide the optimal arrangement for common substrate configurations.

Figure 14:
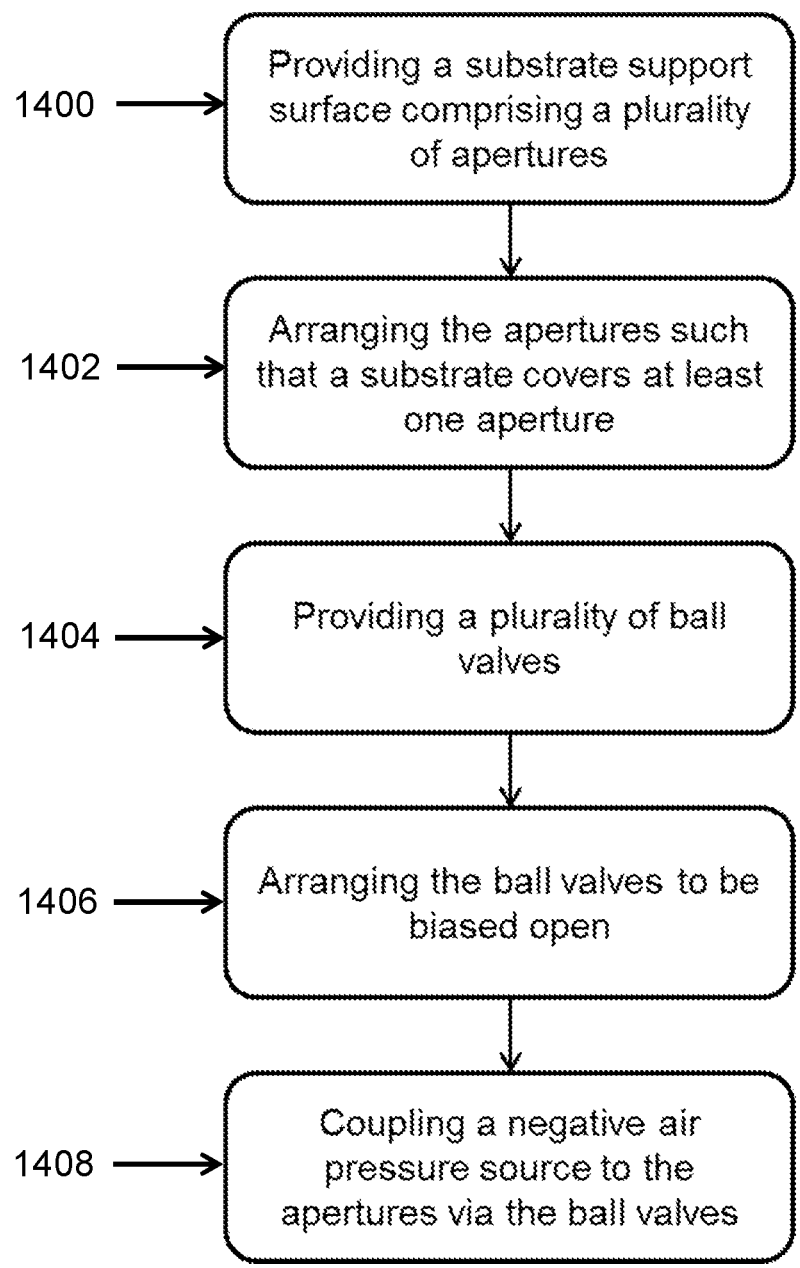
FIG. 14 shows a flowchart of an example of the method of manufacturing a printer table, according to one embodiment.

FIG. 14 shows a flowchart of an example of the method of manufacturing a printer table. The flowchart shows method step 1400 involving providing a substrate support surface comprising a plurality of apertures. The next step 1402 comprises arranging the apertures such that a substrate placed on the printer table covers at least one of the apertures. The method also involves step 1404 involving providing a plurality of ball valves arranged in fluidic connection with the apertures, each of the ball valves having an open configuration and a closed configuration. Step 1406 comprises arranging the plurality of ball valves to be biased to the open configuration. For example this may be achieved by a biasing means such as a spring. Step 1408 comprises coupling a negative air pressure source to the plurality of apertures via the plurality of ball valves.

Figure 15:
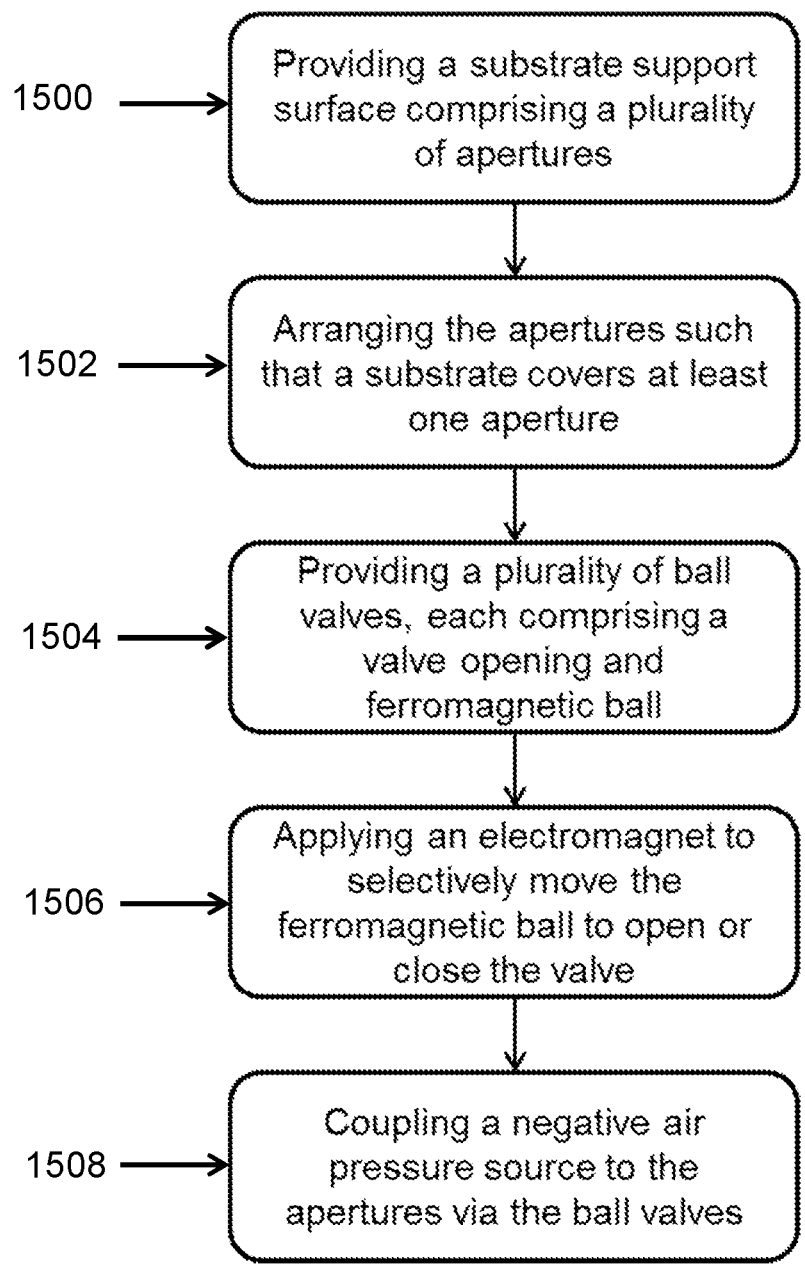
FIG. 15 shows a flowchart of an example of the method of masking a printer table, according to one embodiment.

FIG. 15 shows a flowchart of an example of the method of masking a printer table. This relates to a method of masking a printer table for supporting a substrate during a printing operation. The flowchart shows step 1500 involving providing a substrate support surface comprising a plurality of apertures. Step 1502 then includes arranging the apertures such that a substrate placed on the printer table covers at least one of the apertures. Step 1504 comprises providing a plurality of ball valves arranged in fluidic connection with the apertures, each of the ball valves comprising a valve opening and a ferromagnetic ball, wherein each of the ball valves has an open configuration and a closed configuration. Step 1506 involves applying an electromagnet to selectively move each ferromagnetic ball in relation to its respective valve opening to selectively place the ball valve in the closed configuration or the open configuration. In this case, when the electromagnet positions the ferromagnetic ball against the valve opening, the valve is in the closed configuration. Step 1508 comprises coupling a negative air pressure source to the plurality of apertures via the plurality of ball valves. This ensures that the substrate is held to the support surface for valves that are open, and causes a seal to form between the ferromagnetic ball and the valve opening when the electromagnet places the ball against the valve opening in the case where a substrate does not cover the respective aperture.

The skilled person will appreciate that the description above provides non-limiting examples of the methods and apparatus described in the claims and it is envisaged that the skilled person will appreciate that equivalents may be provided and implemented within the scope of the claims.

I claim:

1. A printer table for supporting a substrate during a printing operation, comprising:
   a substrate support surface comprising a plurality of apertures, the apertures arranged such that a substrate placed on the printer table covers at least one of the apertures, wherein the substrate support surface comprises a plurality of regions, each of the regions comprising a subset of the plurality of apertures;
   a plurality of ball valves, each having an open configuration and a closed configuration, and wherein each ball valve is biased to the open configuration; and
   a negative air pressure source configured to apply a negative air pressure through the plurality of ball valves to the plurality of apertures;
   wherein each ball valve is arranged in fluidic connection with the apertures corresponding to one of the regions, such that there is a one-to-one mapping between the ball valves and the regions; and
   wherein regions arranged towards the centre of the substrate support surface are larger than regions arranged towards the perimeter of the substrate support surface, thereby allowing more precise control over the apertures towards the perimeter of the substrate support surface.

2. The printer table of claim 1, wherein, when an aperture is covered by a substrate, the ball valve remains biased in the open configuration against the negative air pressure.

3. The printer table of claim 1, wherein, when an aperture is not covered by a substrate, the negative air pressure moves the ball valve to the closed configuration.

4. The printer table of claim 1, wherein each of the plurality of ball valves further comprises biasing means for biasing the ball valve to the open configuration.

5. The printer table of claim 4 wherein, when an aperture is covered by a substrate, the biasing means of the ball valve retains the ball valve in the open configuration against the action of the pressure differential.

6. The printer table of claim 4 wherein, when an aperture is not covered by a substrate, the pressure differential acts against the biasing means of the ball valve to move the ball valve to the closed configuration.

7. The printer table of claim 4 wherein the biasing means comprises a spring.

8. The printer table of claim 1, wherein the negative air pressure applied to the ball valve causes a pressure differential across the ball valve and acts against the bias.

9. The printer table of claim 8 wherein the ball valve moves to the closed configuration when the pressure differential across the ball valve exceeds a threshold value.

10. The printer table of claim 1, wherein each of the plurality of ball valves comprises a ball and a valve opening, the ball arranged to form a seal against the valve opening in the closed configuration.

11. The printer table of claim 10, wherein the valve opening has a complementary shape to the ball.

12. The printer table of claim 1 wherein the negative air pressure acts to retain a substrate placed on the substrate support surface against the apertures.

13. The printer table of claim 1, wherein the ball valve is biased to the open configuration by the action of gravity on the ball.

14. The printer table of claim 13, wherein the valve opening is positioned above the ball, such that the weight of the ball positions the ball away from the valve opening and biases the ball valve to the open configuration.

15. The printer table of claim 14, further comprising a ledge for supporting the ball when the ball valve is in the open configuration.

16. The printer table of claim 1, wherein the plurality of regions comprises a first region and a second region, and wherein each of the first and second regions comprises a number of apertures, wherein the number of apertures in the first region is greater than the number of apertures in the second region, and wherein the first region is arranged closer to the centre of the substrate support surface than the second region.

17. A method of manufacturing a printer table for supporting a substrate during a printing operation, the method comprising:
   providing a substrate support surface comprising a plurality of apertures, wherein the substrate support surface comprises a plurality of regions, each of the regions comprising a subset of the plurality of apertures;
   arranging the apertures such that a substrate placed on the printer table covers at least one of the apertures;
   providing a plurality of ball valves, each having an open configuration and a closed configuration;
   arranging each ball valve in fluidic connection with the apertures corresponding to one of the regions, such that there is a one-to-one mapping between the ball valves and the regions;
   arranging the plurality of ball valves to be biased to the open configuration; and
   coupling a negative air pressure source to the plurality of apertures via the plurality of ball valves;
   wherein regions arranged towards the centre of the substrate support surface are larger than regions arranged towards the perimeter of the substrate support surface, thereby allowing more precise control over the apertures towards the perimeter of the substrate support surface.

18. The method of claim 17, wherein the plurality of regions comprises a first region and a second region, and wherein each of the first and second regions comprises a number of apertures, wherein the number of apertures in the first region is greater than the number of apertures in the second region, and wherein the first region is arranged closer to the centre of the substrate support surface than the second region.

* * * * *